(12) United States Patent
Seferian et al.

(10) Patent No.: US 9,294,723 B2
(45) Date of Patent: Mar. 22, 2016

(54) MEETING MANAGEMENT SYSTEM INCLUDING AUTOMATED EQUIPMENT SETUP

(75) Inventors: Ara Seferian, River Vale, NJ (US);
Adam Hanson, Warwick, NY (US);
Toine Leerentveld, Keyport, NJ (US);
Daniel Jackson, Valhalla, NY (US)

(73) Assignee: Creston Electronics, Inc., Rockleigh, NJ (US)

( * ) Notice: Subject to any disclaimer, the term of this patent is extended or adjusted under 35 U.S.C. 154(b) by 601 days.

(21) Appl. No.: 13/564,516

(22) Filed: Aug. 1, 2012

(65) Prior Publication Data

US 2012/0293605 A1 Nov. 22, 2012

Related U.S. Application Data

(63) Continuation-in-part of application No. 13/097,276, filed on Apr. 29, 2011.

(60) Provisional application No. 61/513,728, filed on Aug. 1, 2011.

(51) Int. Cl.
*G06F 15/16* (2006.01)
*H04N 7/15* (2006.01)
*H04N 7/14* (2006.01)
*H04L 12/18* (2006.01)
*H04L 29/06* (2006.01)

(52) U.S. Cl.
CPC .............. *H04N 7/15* (2013.01); *H04L 12/1818* (2013.01); *H04L 65/1069* (2013.01); *H04L 65/4038* (2013.01); *H04N 7/147* (2013.01)

(58) Field of Classification Search
CPC ...... H04N 7/147; H04N 7/15; H04L 12/1818; H04L 65/4038; H04L 65/1069
USPC .......................................... 709/206, 204, 205
See application file for complete search history.

(56) References Cited

U.S. PATENT DOCUMENTS

| | | | |
|---|---|---|---|
| 4,807,155 A * | 2/1989 | Cree et al. ...................... | 715/733 |
| 5,528,263 A | 6/1996 | Platzker et al. | |
| 5,936,625 A | 8/1999 | Kahl et al. | |
| 6,388,654 B1 | 5/2002 | Platzker et al. | |
| 7,149,973 B2 | 12/2006 | Dias et al. | |
| 7,236,976 B2 | 6/2007 | Breitenbach et al. | |
| 7,299,289 B1 | 11/2007 | Lorenz et al. | |
| 7,328,406 B2 | 2/2008 | Kalinoski et al. | |
| 7,634,540 B2 * | 12/2009 | Ivashin et al. ................. | 709/204 |

(Continued)

FOREIGN PATENT DOCUMENTS

WO WO 0065833 A1 * 11/2000
WO WO 03049438 A1 * 6/2003

(Continued)

*Primary Examiner* — Douglas Blair
(74) *Attorney, Agent, or Firm* — Creston Electronics, Inc

(57) ABSTRACT

In an illustrative embodiment, a method comprises displaying at least one preset parameter associated with a conference type. The conference type is associated with preset resources. The method further comprises accepting information defining the conference type, receiving preset information from the at least one displayed preset parameter, automatically determining a room by communicating with a scheduling server the availability of the preset resources based on the received preset information, and sending at least one command to control the associated preset resources in response to the start time and end time.

14 Claims, 41 Drawing Sheets

(56) References Cited

U.S. PATENT DOCUMENTS

| | | |
|---|---|---|
| 7,664,490 B2 | 2/2010 | Aaby et al. |
| 7,720,251 B2 | 5/2010 | Allen et al. |
| 7,734,804 B2 | 6/2010 | Lorenz et al. |
| 7,881,233 B2 | 2/2011 | Bieselin |
| 7,913,156 B2 | 3/2011 | Dias et al. |
| 8,140,980 B2* | 3/2012 | Gunasekar et al. ............ 715/753 |
| 2002/0188731 A1 | 12/2002 | Potekhin et al. .............. 709/227 |
| 2003/0005055 A1* | 1/2003 | Ralston et al. ................ 709/204 |
| 2003/0103075 A1* | 6/2003 | Rosselot ....................... 345/717 |
| 2005/0071213 A1* | 3/2005 | Kumhyr et al. .................. 705/8 |
| 2006/0015376 A1* | 1/2006 | Sattler et al. ..................... 705/5 |
| 2006/0171337 A1* | 8/2006 | Shaffer et al. ................ 370/261 |
| 2006/0187859 A1* | 8/2006 | Shaffer et al. ................ 370/260 |
| 2006/0239212 A1 | 10/2006 | Pirzada et al. |
| 2008/0084984 A1 | 4/2008 | Levy et al. |
| 2008/0235362 A1 | 9/2008 | Kjesbu et al. |
| 2010/0070314 A1* | 3/2010 | Jethani et al. ..................... 705/6 |
| 2010/0169652 A1* | 7/2010 | Butler ........................... 713/176 |
| 2011/0071862 A1* | 3/2011 | Cator et al. ....................... 705/5 |
| 2011/0184768 A1* | 7/2011 | Norton et al. ..................... 705/5 |
| 2012/0278408 A1* | 11/2012 | Seferian et al. ............... 709/206 |
| 2013/0006695 A1* | 1/2013 | Haustein et al. ............. 705/7.26 |
| 2013/0127979 A1* | 5/2013 | Koh et al. .................. 348/14.08 |

FOREIGN PATENT DOCUMENTS

| | | |
|---|---|---|
| WO | WO 03073229 A2 * | 9/2003 |
| WO | WO 2005034498 A1 * | 4/2005 |

\* cited by examiner

MEETING MANAGEMENT SYSTEM INCLUDING AUTOMATED EQUIPMENT SETUP

BACKGROUND OF THE INVENTION

1. Technical Field

The present invention relates to managing, scheduling, and initiating conference room and/or conference room resources based on the type of conference. More particularly, the invention relates to the management of conference room presets that are associated with the particular type of conference.

2. Background Art

Anyone who has attempted to arrange a meeting with a busy client or friend is familiar with the concept of phone tag. In phone tag, one may try to reach a client, co-worker or friend to set up a meeting but forced to leave a message because the other party is either not in or on another line. Email does not often produce better results because the email messages may be received by an unmanned terminal or, while the inviter waits on a response from an invitee, the inviter is forced to cancel the meeting due to a conflict only to receive an acceptance from the invitee shortly thereafter. It is easy to see that those difficulties can grow exponentially when the inviter is scheduling a multiparty meeting or seeking to use resources simultaneously available to numerous other parties.

In an attempt to reduce these and other difficulties, a variety of calendaring and notification applications and utilities exist. However, along with the capabilities included in each are a number of limitations. For example, many web portals offer registered users the ability to maintain a calendar for their personal use. While such calendars are accessible from substantially any point from which a user can access a web browser and the Internet, such calendars are limited in that they typically may be viewed only by the party to whom they belong, i.e., the registered user, and they make little to no provision for configuring one more levels of access control.

Likewise, programs such as Microsoft Outlook® and Lotus Notes® offer a variety of calendar specific capabilities as well as a number of associated functions, such as the ability to organize meetings, including managing invitee lists. However, like their web portal counterparts, such applications are also burdened by limitations. For example, Microsoft Outlook® permits users to share their calendar with delegates. However, Microsoft Outlook® does not manage and/or initiate conference room resources such as conference room devices (e.g., projectors).

Moreover, these calendaring and notification applications do not communicate with the conference room resources. As a result, the organizer has to arrive early in order to prepare the conference room resources for the meeting. For example, the organizer has to power on the conference room resources such as a projector or dial into a conference call. Problems also arise when the conference room resources are not functioning. The organizer would waste time by attempting to diagnose and fix the problem. Problems that are not quickly resolved often require dispatching someone to the conference room. As a result, valuable time and resources are lost in many conferences while help is summoned, technicians are located, equipment power is cycled, and problems are diagnosed and repaired.

Therefore, there is a need in the art for managing, scheduling, and initiating a conference room and/or conference room resources based on preset information.

SUMMARY OF THE INVENTION

It is to be understood that both the general and detailed descriptions that follow are exemplary and explanatory only and are not restrictive of the invention.

DISCLOSURE OF INVENTION

Principles of the invention provide systems, methods, and software for managing, scheduling, and initiating a conference room and/or conference room resources based on preset information. For example, in a first aspect of the invention, a system, comprises at least one processor, a memory being operably associated with the at least one processor, at least one data storage device being operably associated with the memory and the at least one processor, and at least one communication interface being operably associated with the at least one processor and memory. The at least one communication interface is configured to enable communications between the information handling system and one or more user communication devices. The system further comprises at least one program of instructions stored in the memory and executable in the processor. The program of instructions is operable to accept information defining a conference type. The conference type is associated with preset resources. The program of instructions is further operable to display at least one preset parameter associated with the conference type, and receive preset information from the at least one displayed preset parameter. The preset information includes a start time and an end time. The program of instructions is yet further operable to automatically determine a room by communicating with a scheduling server the availability of the preset resources based on the received preset information, notify a conference initiator of the room, and send at least one command to control the associated preset resources in response to the start time and end time.

In a second aspect of the invention a method for managing a room reservation comprises displaying at least one preset parameter associated with a conference type. The conference type is associated with preset resources. The method further comprises accepting information defining the conference type and receiving preset information from the at least one displayed preset parameter. The preset information includes a start time and an end time. The method yet further comprises automatically determining a room by communicating with a scheduling server the availability of the preset resources based on the received preset information, and sending at least one command to control the associated preset resources in response to the start time and end time.

In a third aspect of the invention, a resource management system comprises at least one processor, a memory being operably associated with the at least one processor, at least one data storage device being operably associated with the memory and the at least one processor, and at least one communication interface being operably associated with the at least one processor and the memory. The at least one communication interface is configured to enable communications between the information handling system and one or more user communication devices. The resource management system further comprises at least one program of instructions stored in the memory and executable in the processor, the program of instructions being operable to generate a first content page having three sub-content pages and to accept a user's first and last name, preferred theme, work hours and days, shared document file, language preference, and time zone in the first sub-content page. The program of instructions is further operable to accept email format, email address, and sender's name in the second sub-content page, and accept plug-in information including at least one of a refresh rate, audible alert settings, instant message color, instant messaging, short messaging service, multimedia messaging service, email, software and firmware updates, database wide searching, pop-up, voice, and phone call in the third sub-content page.

In a fourth aspect of the invention, a resource management system, comprises at least one processor, a memory being operably associated with the at least one processor, at least one data storage device being operably associated with the memory and the at least one processor, and at least one communication interface being operably associated with the at least one processor and the memory. The at least one communication interface is configured to enable communications between the information handling system and one or more user communication devices. The resource management system further comprises at least one program of instructions stored in the memory and executable in the processor, the program of instructions being operable to (1) generate a first content page having three sub-content pages, accept a user's first and last name, preferred theme, work hours and days, shared document file, language preference, and time zone in the first sub-content page, (2) accept email format, email address, and sender's name in the second sub-content page, (3) accept a refresh rate, audible alert settings, and instant messaging color in the third sub-content page, (4) generate a second content page having at least one sub-content page, and (5) display in the at least one sub-content page at least one preset parameter associated with a conference type. The conference type is associated with preset resources and the at least one sub-content page includes at least one other level sub-content page to display additional preset parameters including the meeting type and event type, discussion, presentation, audio call, video call, audio and video call, shared documentation, phone number, passcode, and video number. The program of instructions is further operable to (1) receive preset information from the displayed at least one preset parameter, (2) automatically determine a room by communicating with a scheduling server the availability of the preset resources based on the received preset information, and (3) send at least one command to control the associated preset resources in response to the received preset information.

In a fifth aspect of the invention, a meeting management system including automated equipment setup comprises at least one processor, a memory being operably associated with the at least one processor, at least one data storage device being operably associated with the memory and the at least one processor, at least one communication interface being operably associated with the at least one processor and memory. The at least one communication interface is configured to enable communications between the information handling system and one or more user communication devices. At least one program of instructions is stored in the memory and executable in the processor, the program of instructions being operable to display a conference type. The conference type is a meeting type and an event type. The meeting type is an assembly of people for a specific purpose and the event type is an occurrence. The program of instructions is further operable to accept information from the selected conference type. The selected conference type is associated with at least one audio/visual equipment. The program of instructions is further operable to display at least one preset parameter associated with the conference type. The preset parameter includes a start time and an end time, name of the event, location, time, start date, reoccurrence, and description of the event, a date for the conference, a welcome message, at least one image, shared documentation, phone number, passcode, and video number. The program of instructions is further operable to receive information from the at least one displayed preset parameter, automatically determine a room by communicating with a scheduling server the availability of the at least one audio visual equipment based on the received information from the at least one displayed parameter, notify a conference initiator of the room, and send at least one command to control the associated audio visual equipment in response to the start time and end time.

The present invention seeks to overcome or at least ameliorate one or more of several problems, including but not limited to: providing a method, system, and software for managing, scheduling, and initiating a conference room and/or conference room resources based on preset information.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

BRIEF DESCRIPTION OF THE SEVERAL VIEWS OF THE DRAWINGS

Figure 1:
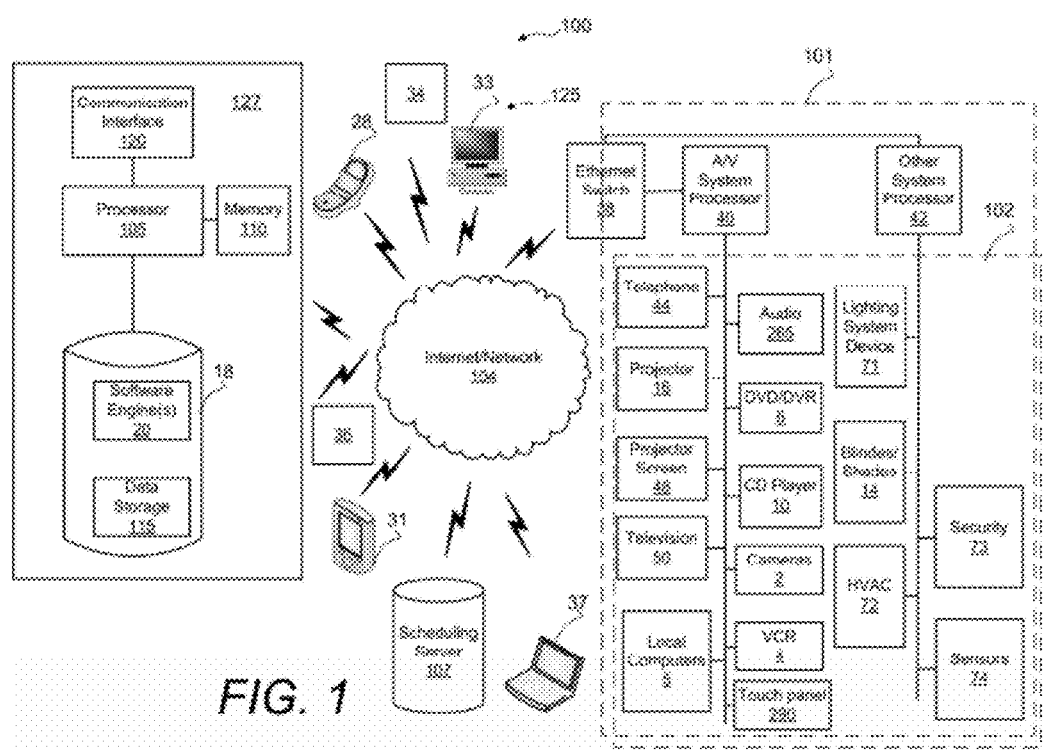

FIG. 1 illustrates a schematic diagram depicting a system for managing, scheduling, and initiating conference room and conference room resources based on preset information in accordance with an illustrative embodiment of the present invention.

Figure 2:
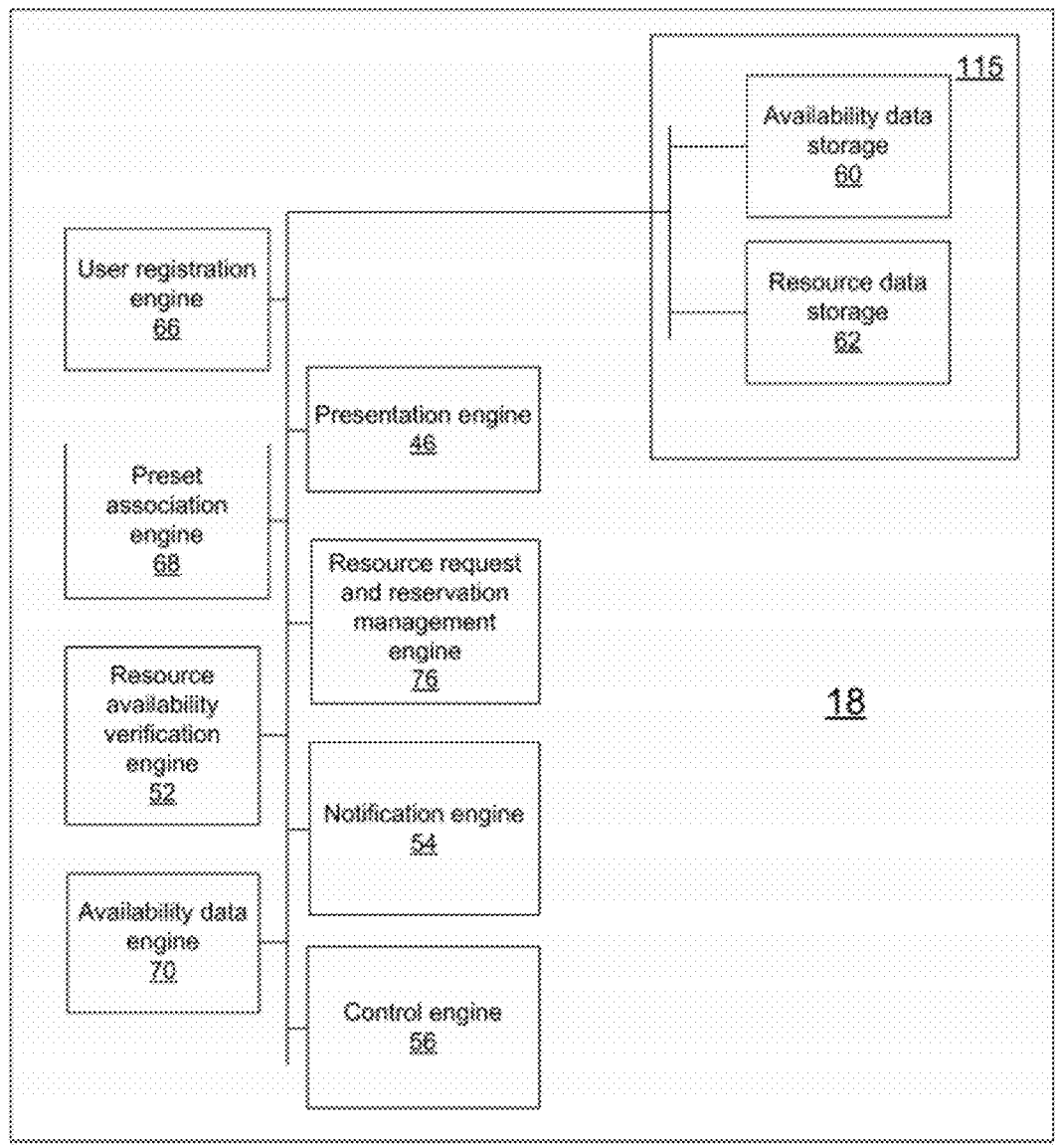

FIG. 2 illustrates a schematic diagram of a plurality of software engines and data storage areas for managing, scheduling, and initiating conference room and conference room resources based on preset information in accordance with an illustrative embodiment of the present invention.

Figure 3:
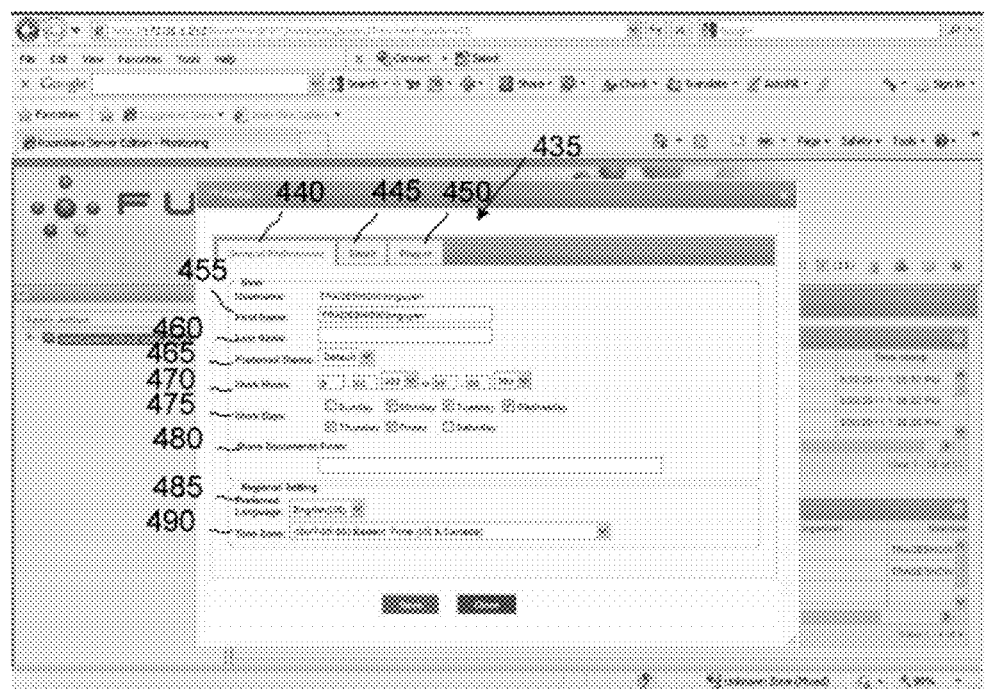

FIG. 3 illustrates a schematic diagram of the system content page in accordance with an illustrative embodiment of the present invention.

Figure 4:
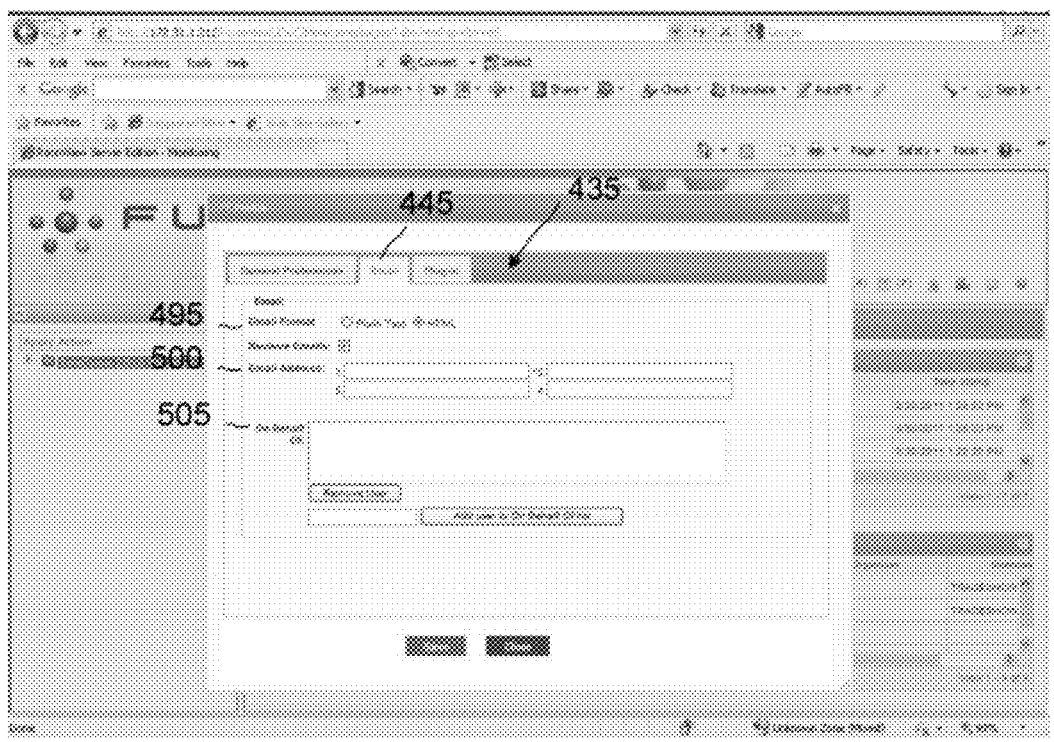

FIG. 4 illustrates another schematic diagram of the system content page in accordance with an illustrative embodiment of the present invention.

Figure 5:
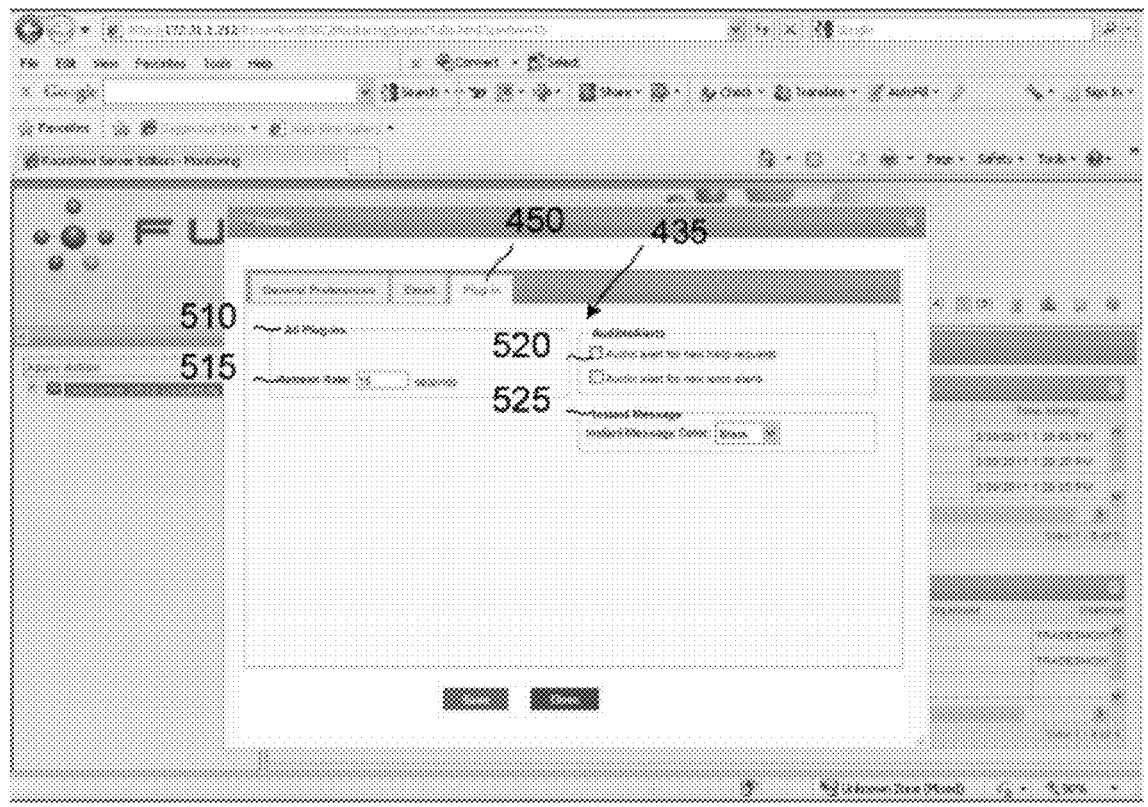

FIG. 5 illustrates yet another schematic diagram of the system content page in accordance with an illustrative embodiment of the present invention.

Figure 6:
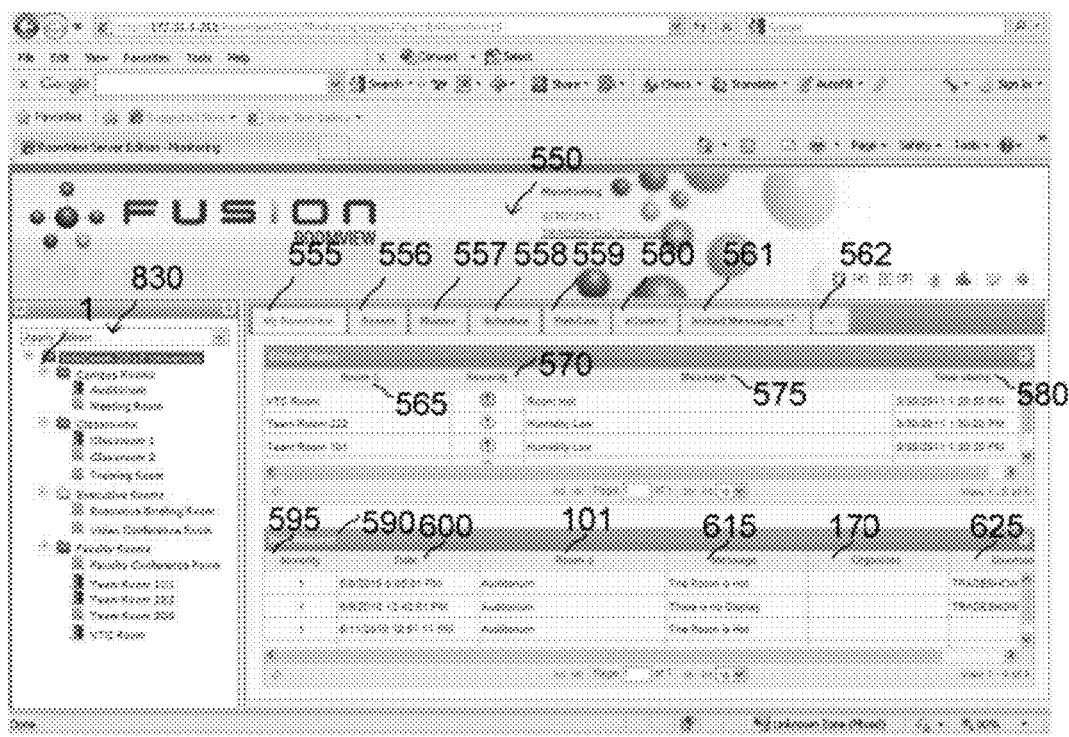

FIG. 6 illustrates yet another schematic diagram of the system content page in accordance with an illustrative embodiment of the present invention.

Figure 7:
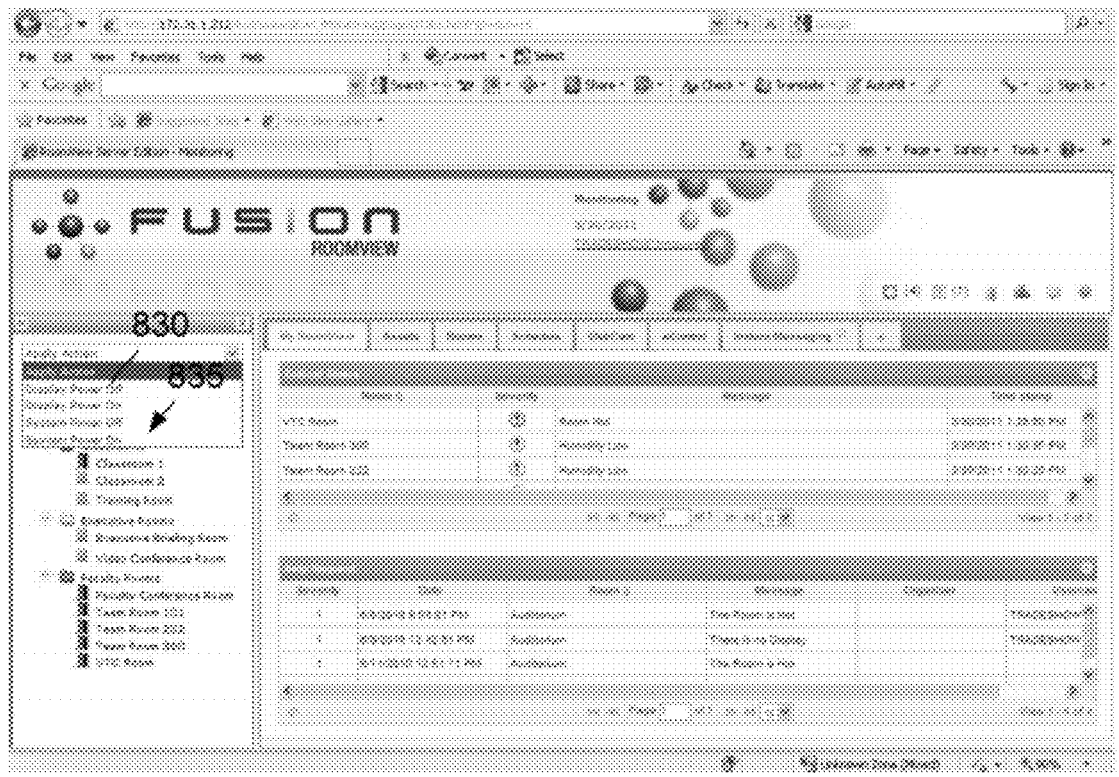

FIG. 7 illustrates yet another schematic diagram of the system content page in accordance with an illustrative embodiment of the present invention.

Figure 8:
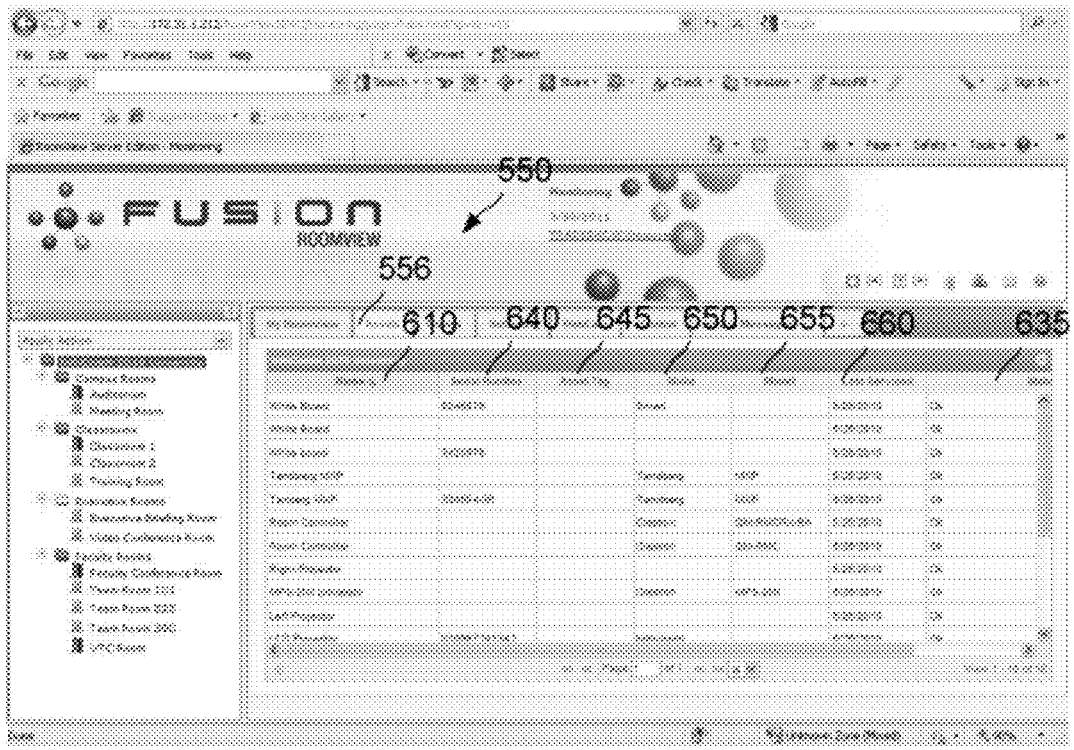

FIG. 8 illustrates yet another schematic diagram of the system content page in accordance with an illustrative embodiment of the present invention.

Figure 9:
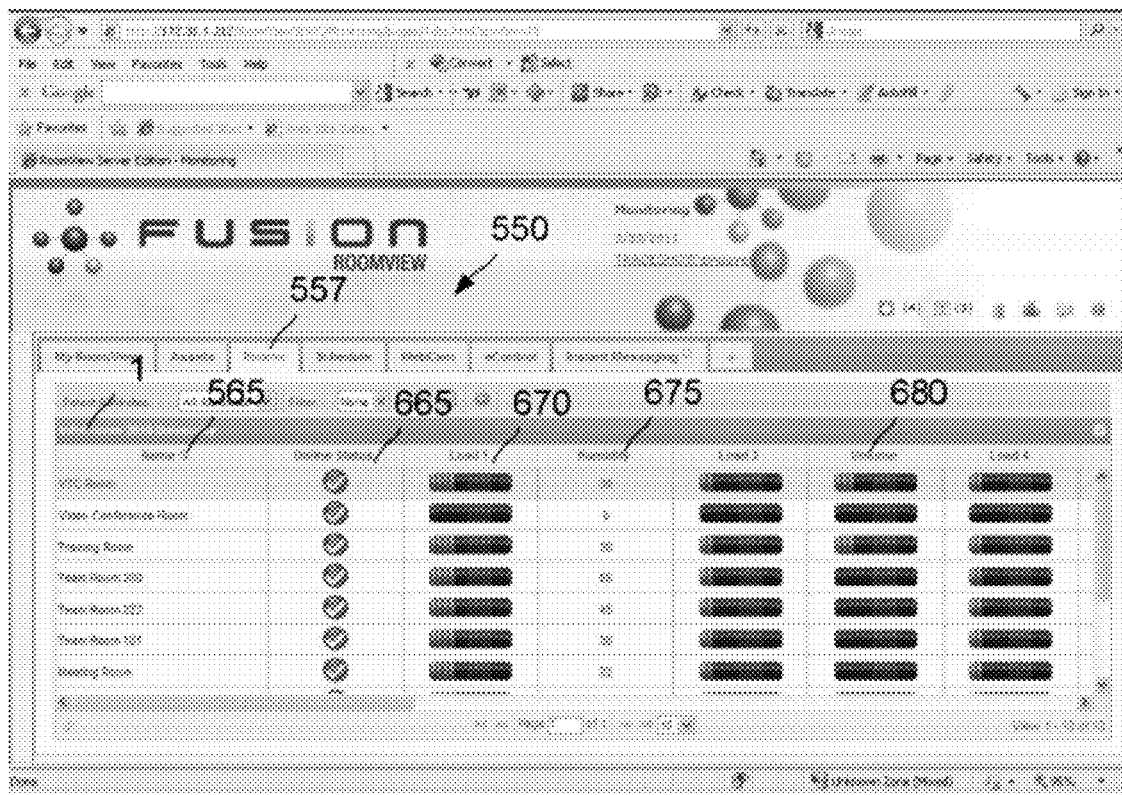

FIG. 9 illustrates yet another schematic diagram of the system content page in accordance with an illustrative embodiment of the present invention.

Figure 10:
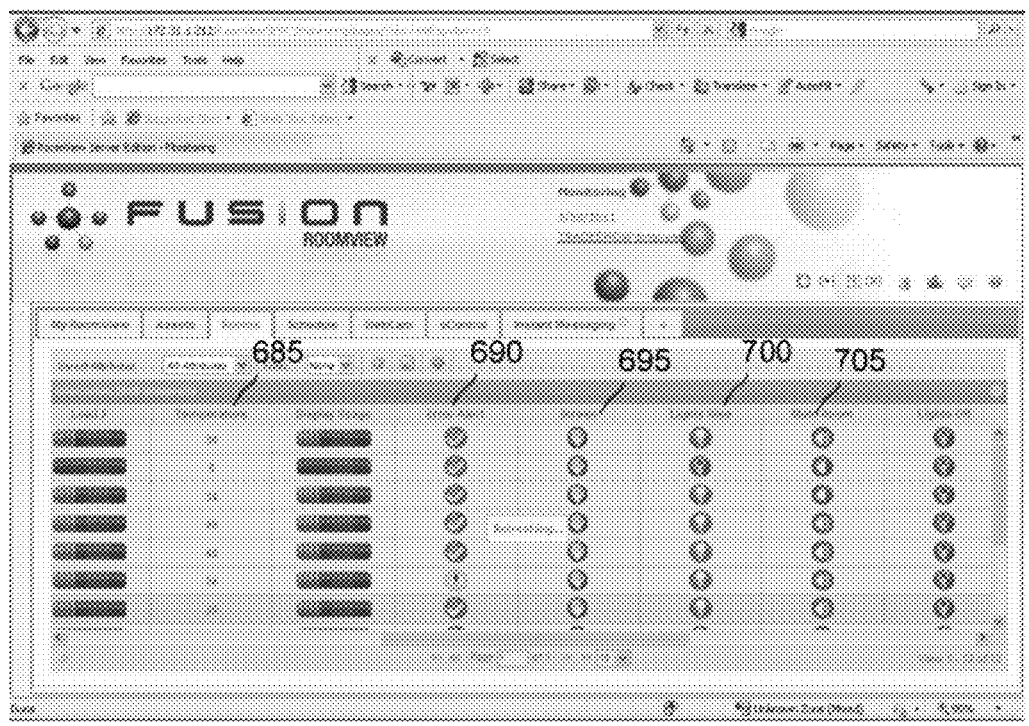

FIG. 10 illustrates yet another schematic diagram of the system content page in accordance with an illustrative embodiment of the present invention.

Figure 11:
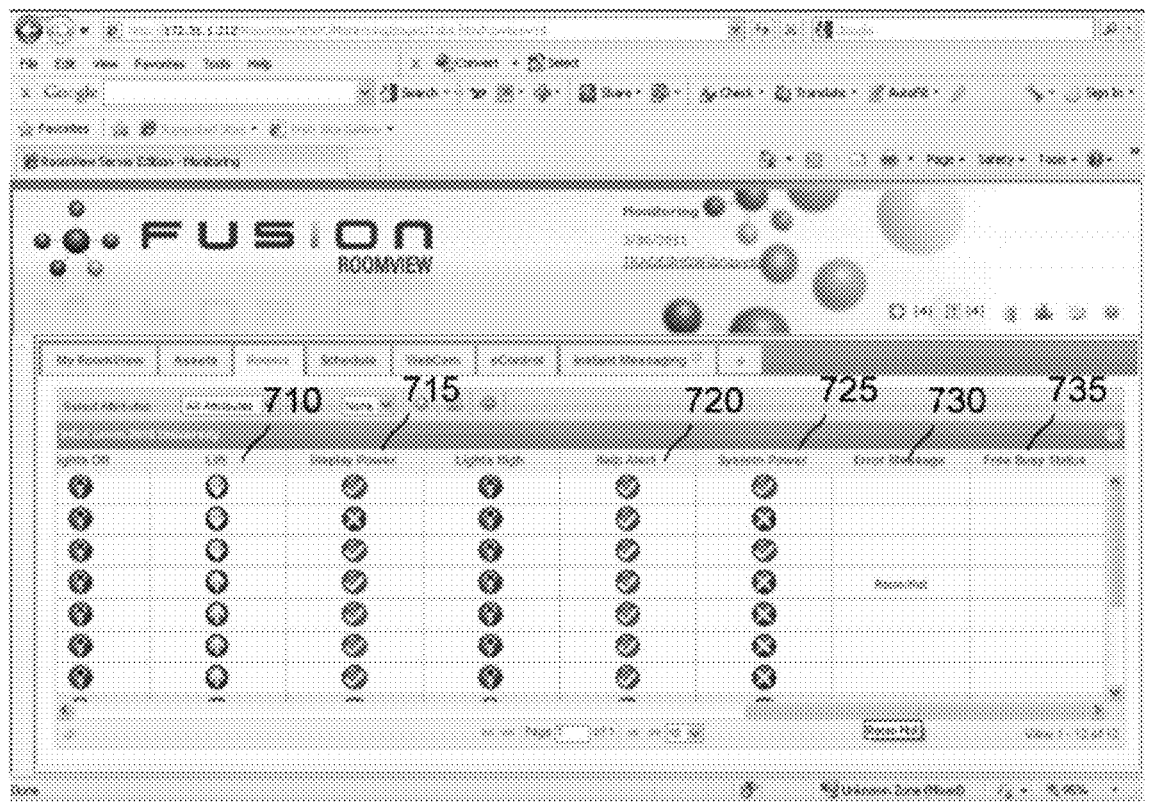

FIG. 11 illustrates yet another schematic diagram of the system content page in accordance with an illustrative embodiment of the present invention.

Figure 12:
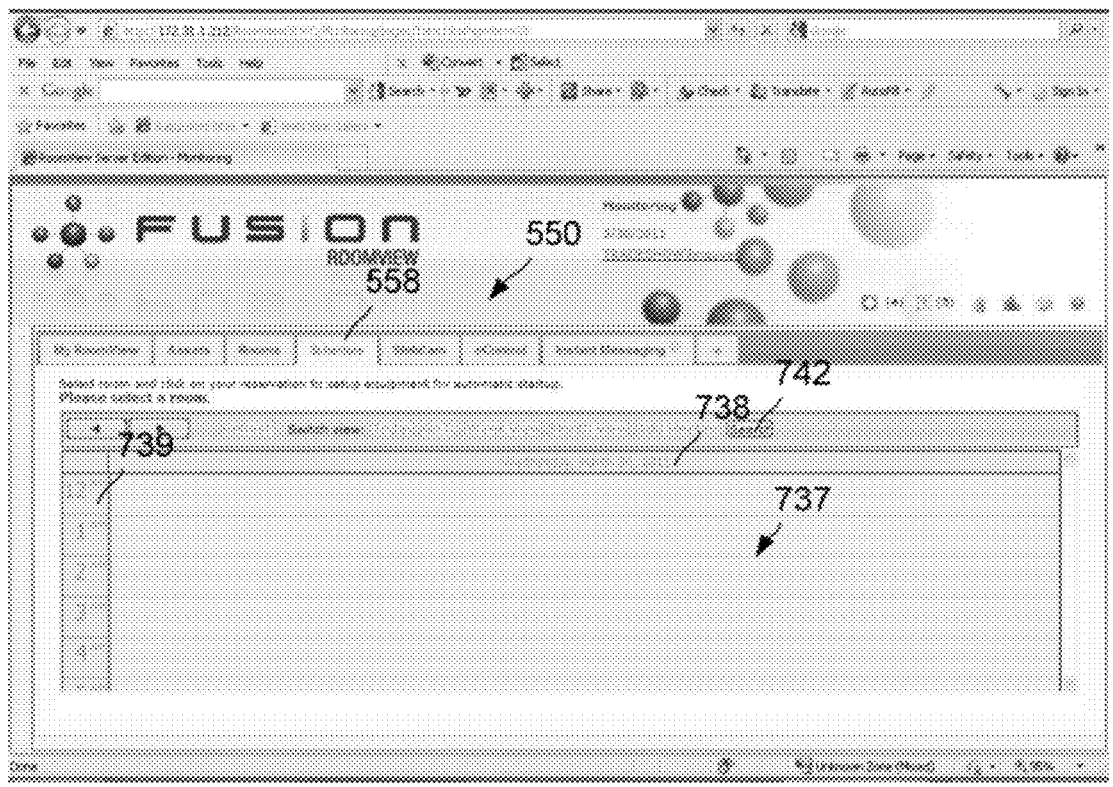

FIG. 12 illustrates yet another schematic diagram of the system content page in accordance with an illustrative embodiment of the present invention.

Figure 13:
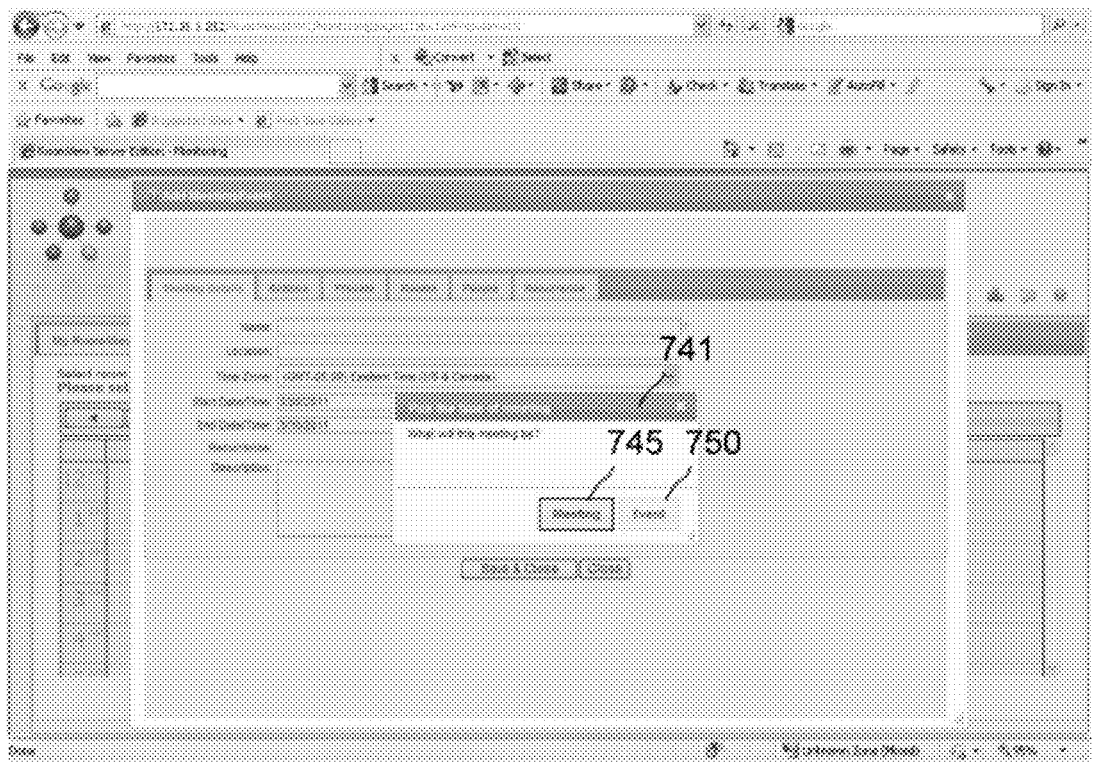

FIG. 13 illustrates yet another schematic diagram of the system content page in accordance with an illustrative embodiment of the present invention.

Figure 14:
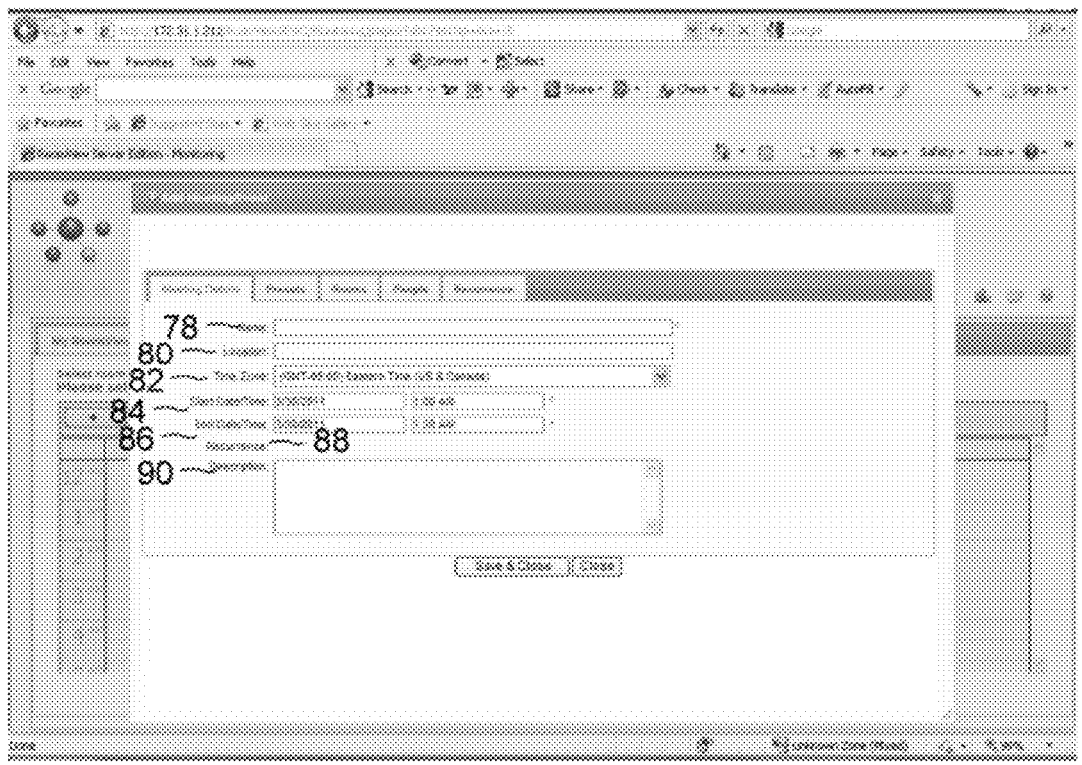

FIG. 14 illustrates yet another schematic diagram of the system content page in accordance with an illustrative embodiment of the present invention.

Figure 15:
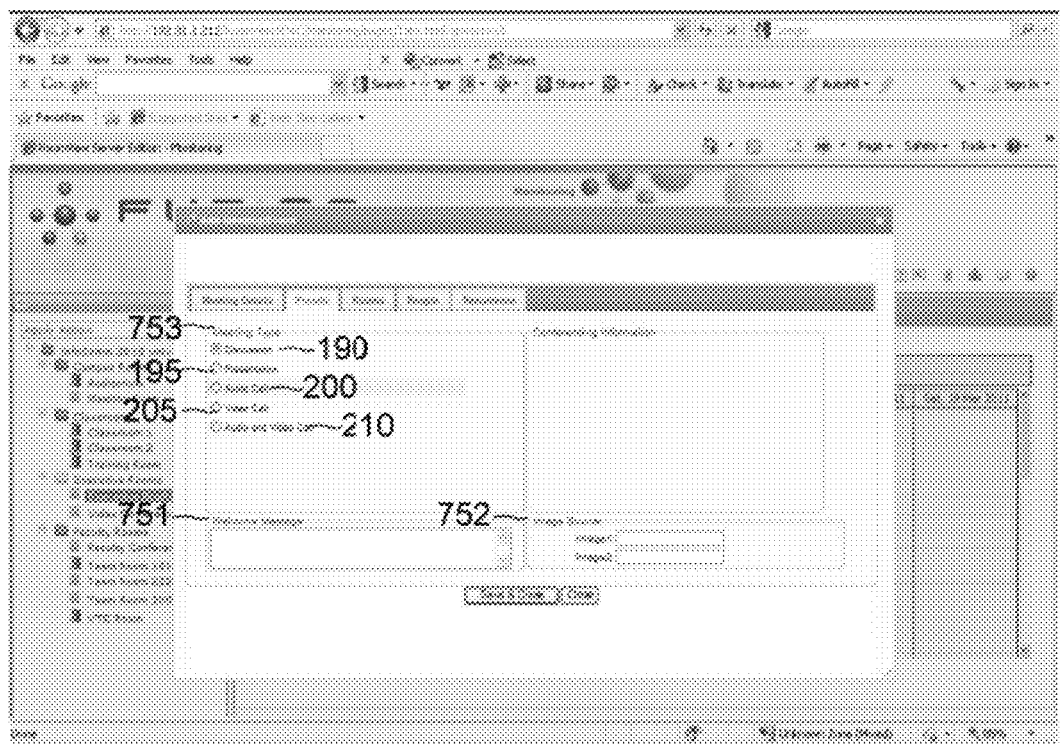

FIG. 15 illustrates yet another schematic diagram of the system content page in accordance with an illustrative embodiment of the present invention.

Figure 16:
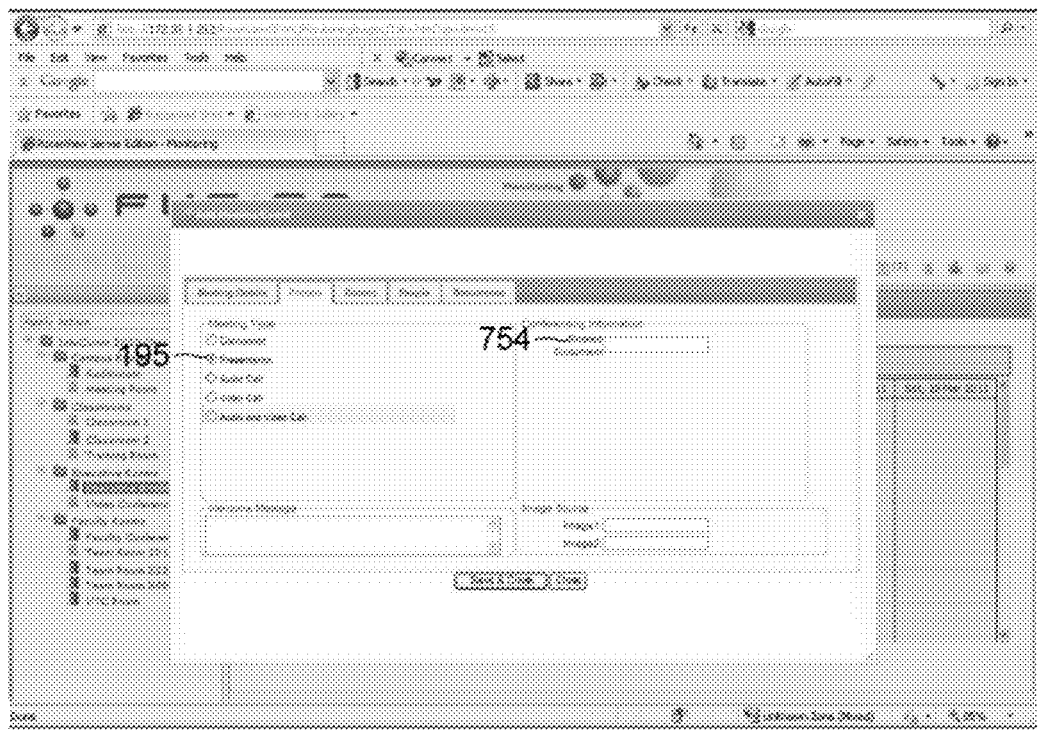

FIG. 16 illustrates yet another schematic diagram of the system content page in accordance with an illustrative embodiment of the present invention.

Figure 17:
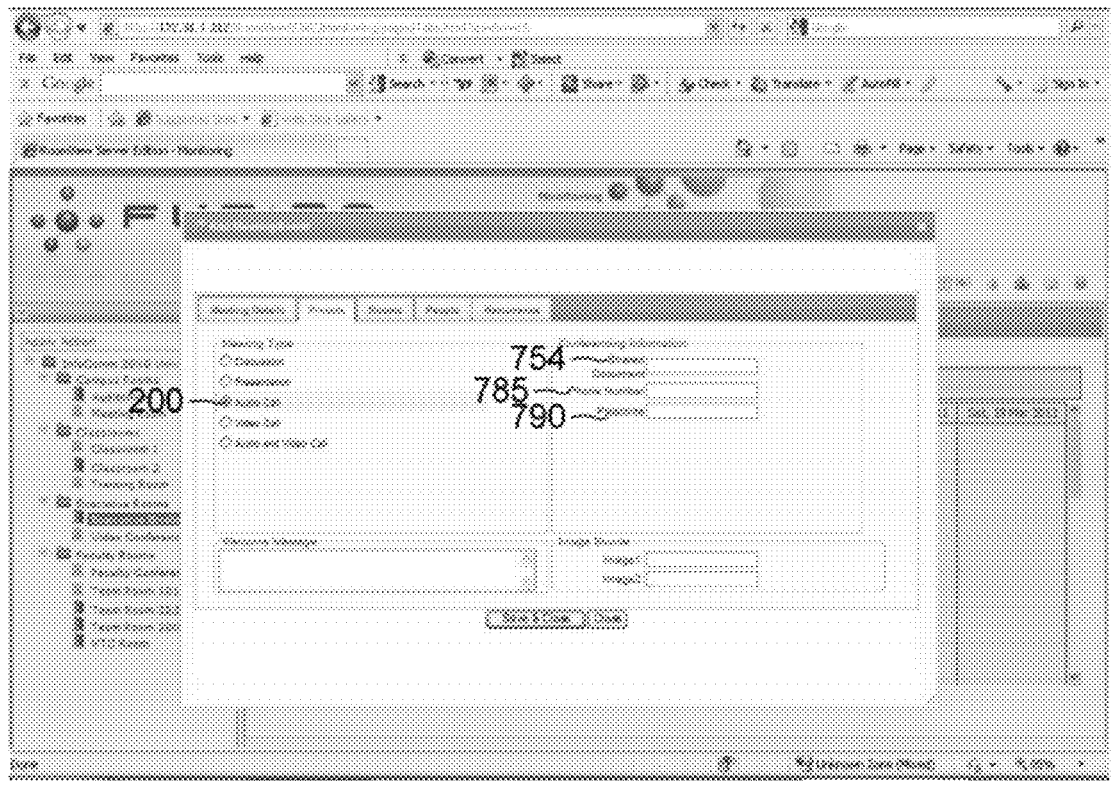

FIG. 17 illustrates yet another schematic diagram of the system content page in accordance with an illustrative embodiment of the present invention.

Figure 18:
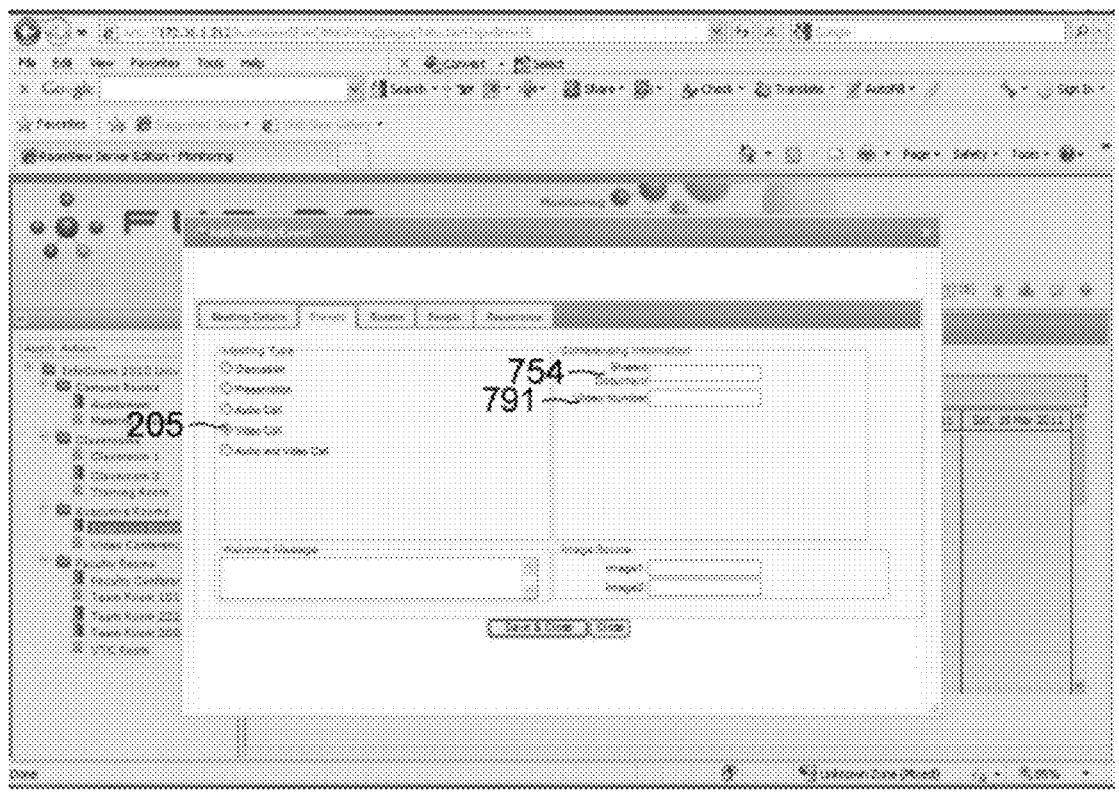

FIG. 18 illustrates yet another schematic diagram of the system content page in accordance with an illustrative embodiment of the present invention.

Figure 19:
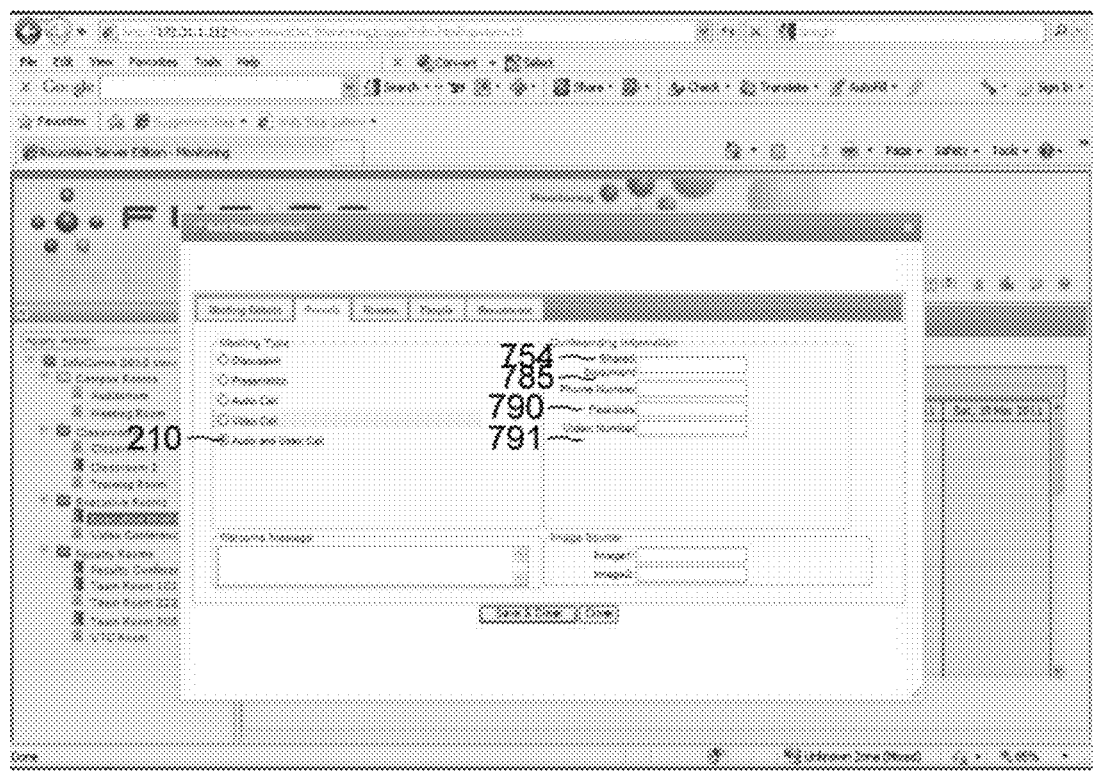

FIG. 19 illustrates yet another schematic diagram of the system content page in accordance with an illustrative embodiment of the present invention.

Figure 20:
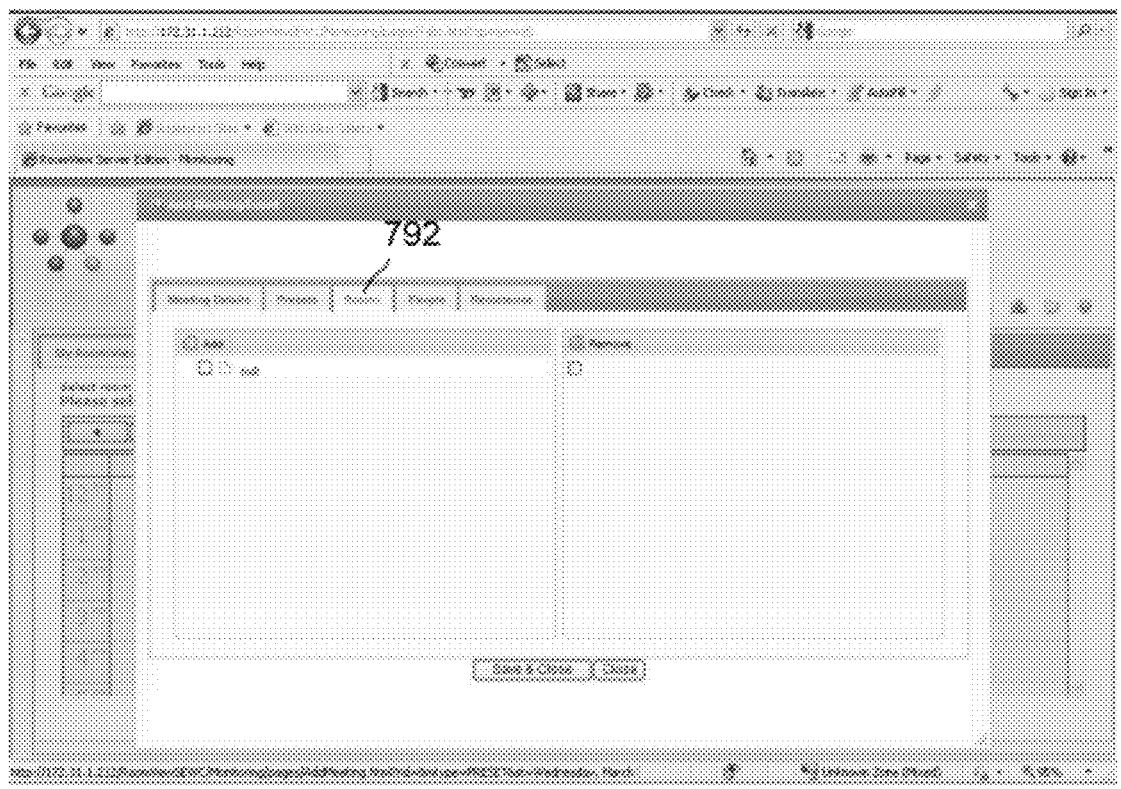

FIG. 20 illustrates yet another schematic diagram of the system content page in accordance with an illustrative embodiment of the present invention.

Figure 21:
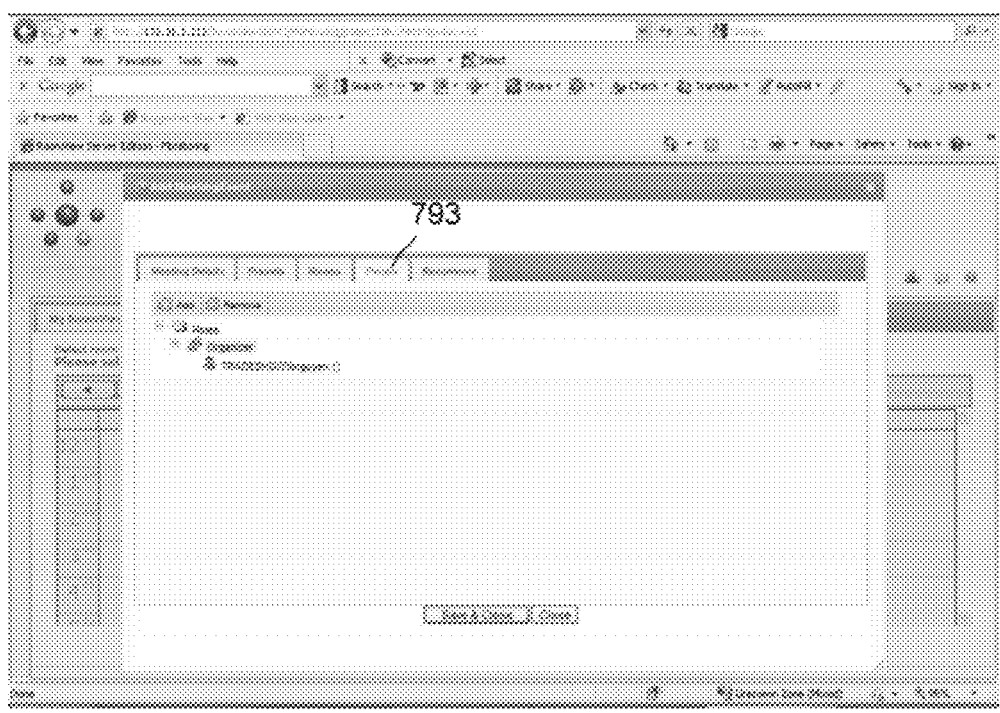

FIG. 21 illustrates yet another schematic diagram of the system content page in accordance with an illustrative embodiment of the present invention.

Figure 22:
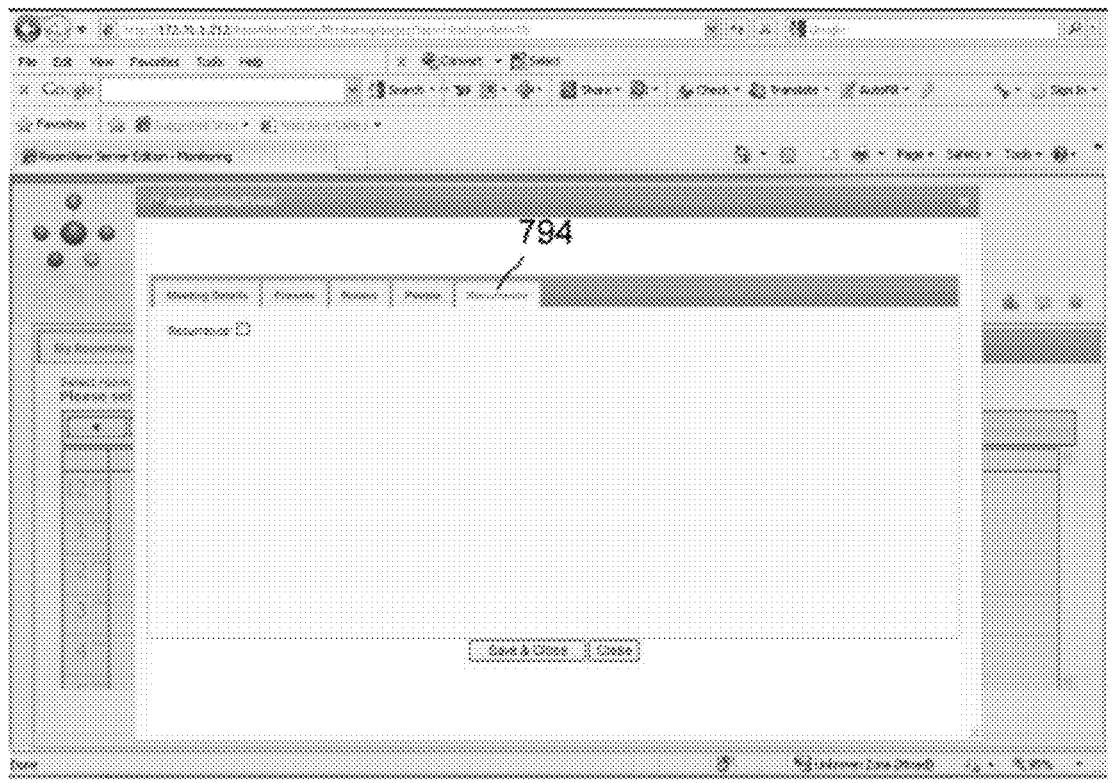

FIG. 22 illustrates yet another schematic diagram of the system content page in accordance with an illustrative embodiment of the present invention.

Figure 23:
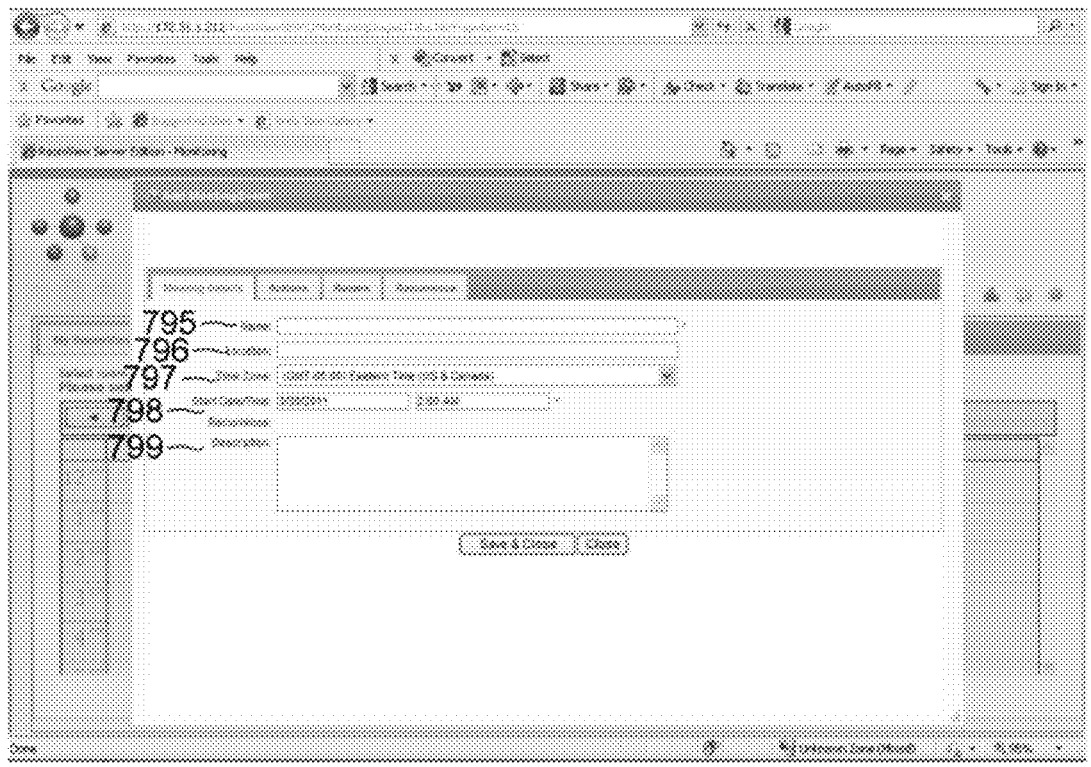

FIG. 23 illustrates yet another schematic diagram of the system content page in accordance with an illustrative embodiment of the present invention.

Figure 24:
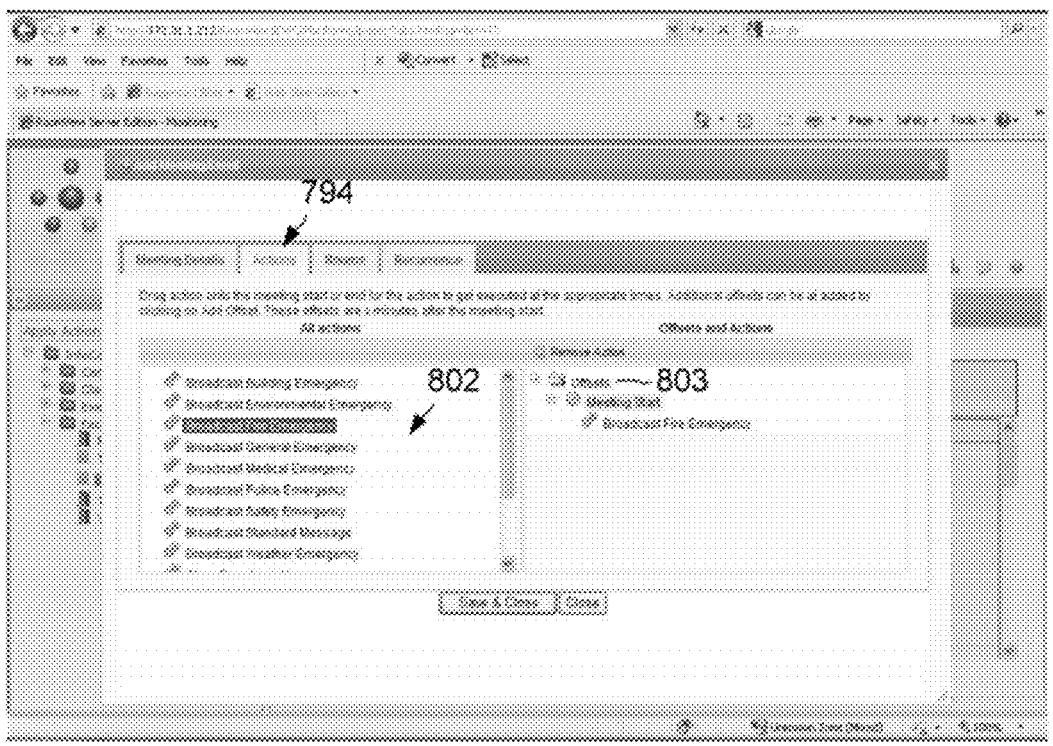

FIG. 24 illustrates yet another schematic diagram of the system content page in accordance with an illustrative embodiment of the present invention.

Figure 25:
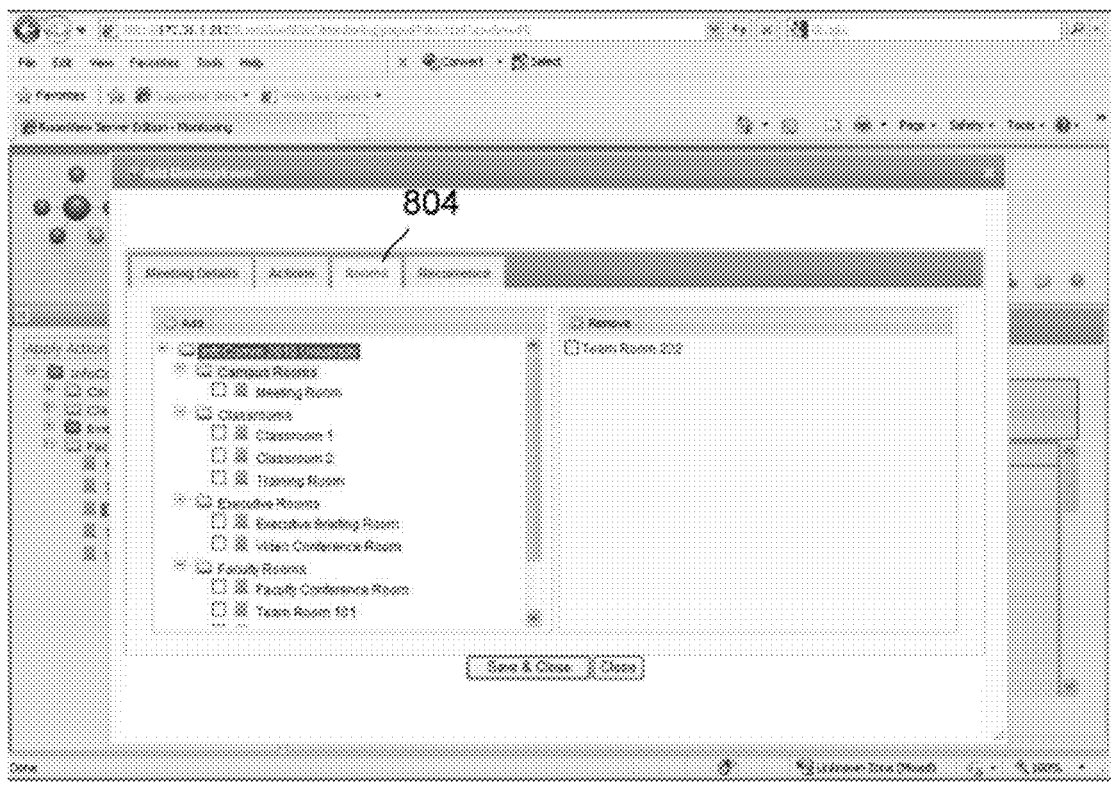

FIG. 25 illustrates yet another schematic diagram of the system content page in accordance with an illustrative embodiment of the present invention.

Figure 26:
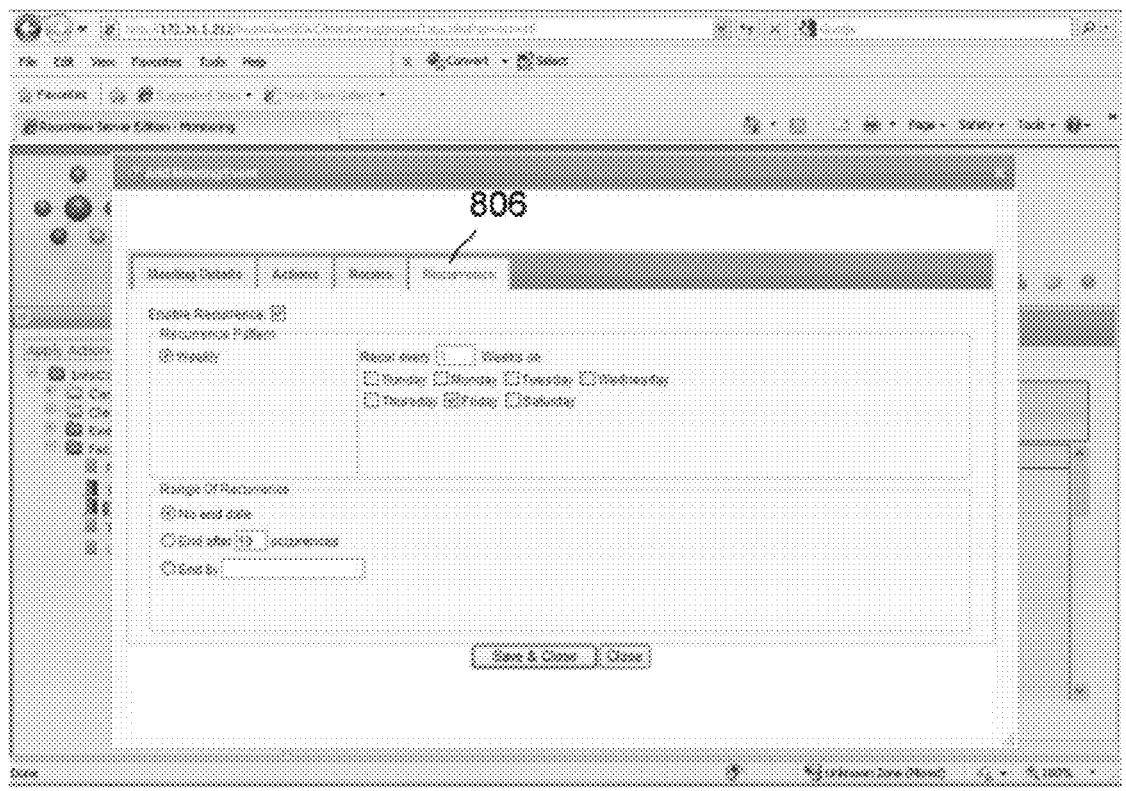

FIG. 26 illustrates yet another schematic diagram of the system content page in accordance with an illustrative embodiment of the present invention.

Figure 27:

FIG. 27 illustrates yet another schematic diagram of the system content page in accordance with an illustrative embodiment of the present invention.

Figure 28:

FIG. 28 illustrates yet another schematic diagram of the system content page in accordance with an illustrative embodiment of the present invention.

Figure 29:
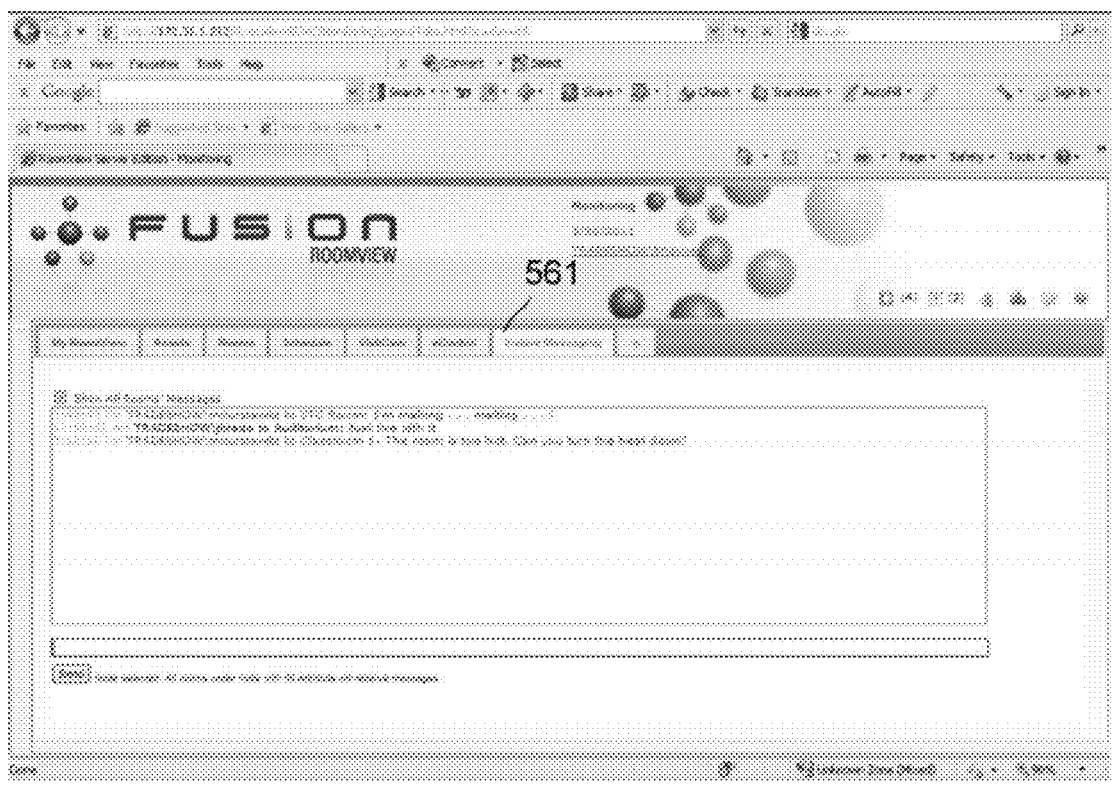

FIG. 29 illustrates yet another schematic diagram of the system content page in accordance with an illustrative embodiment of the present invention.

Figure 30:
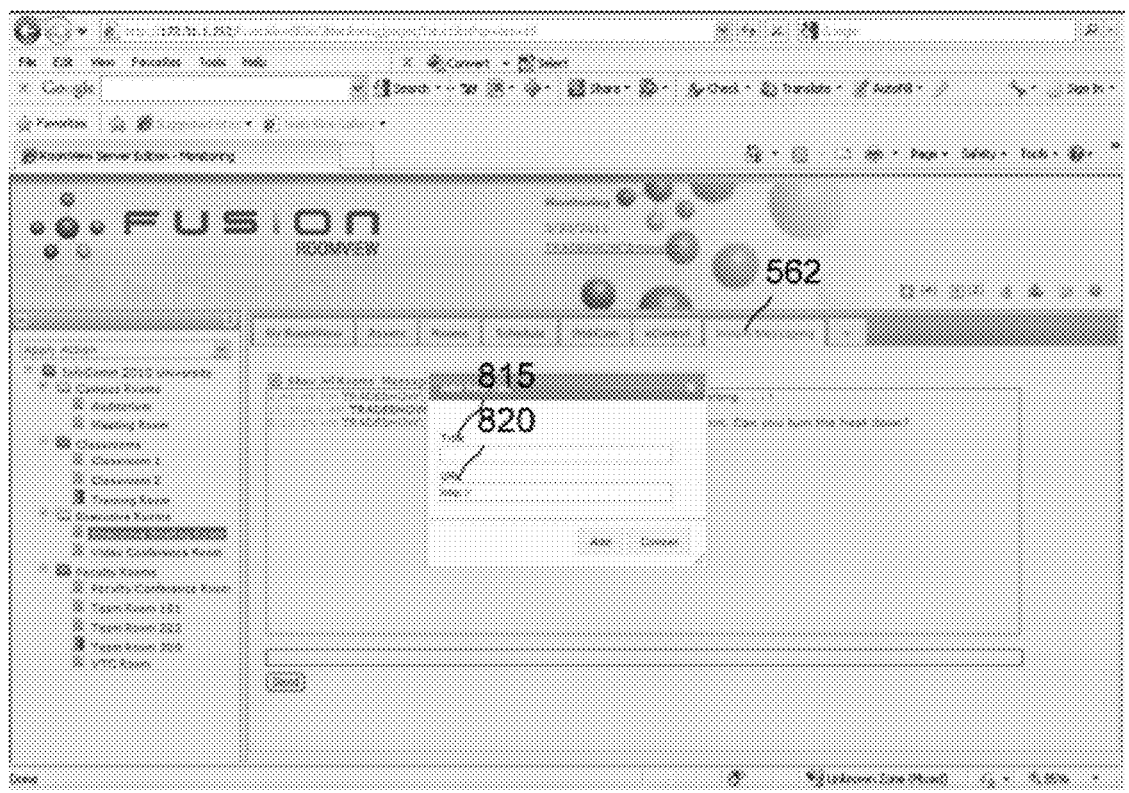

FIG. 30 illustrates yet another schematic diagram of the system content page in accordance with an illustrative embodiment of the present invention.

Figure 31:
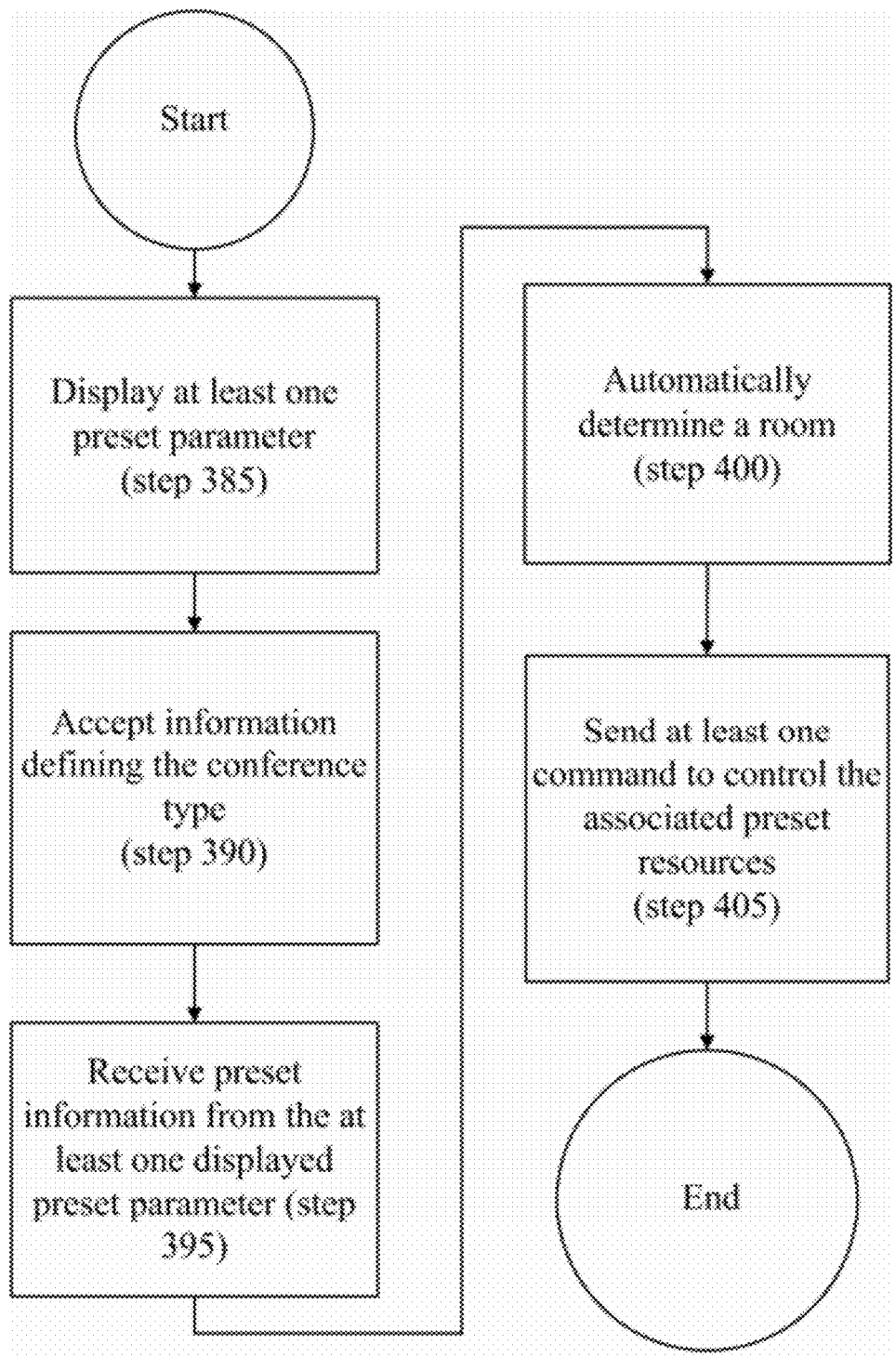

FIG. 31 illustrates a flowchart of a meeting management method including automated equipment setup in accordance with an illustrative embodiment of the present invention.

Figure 32:
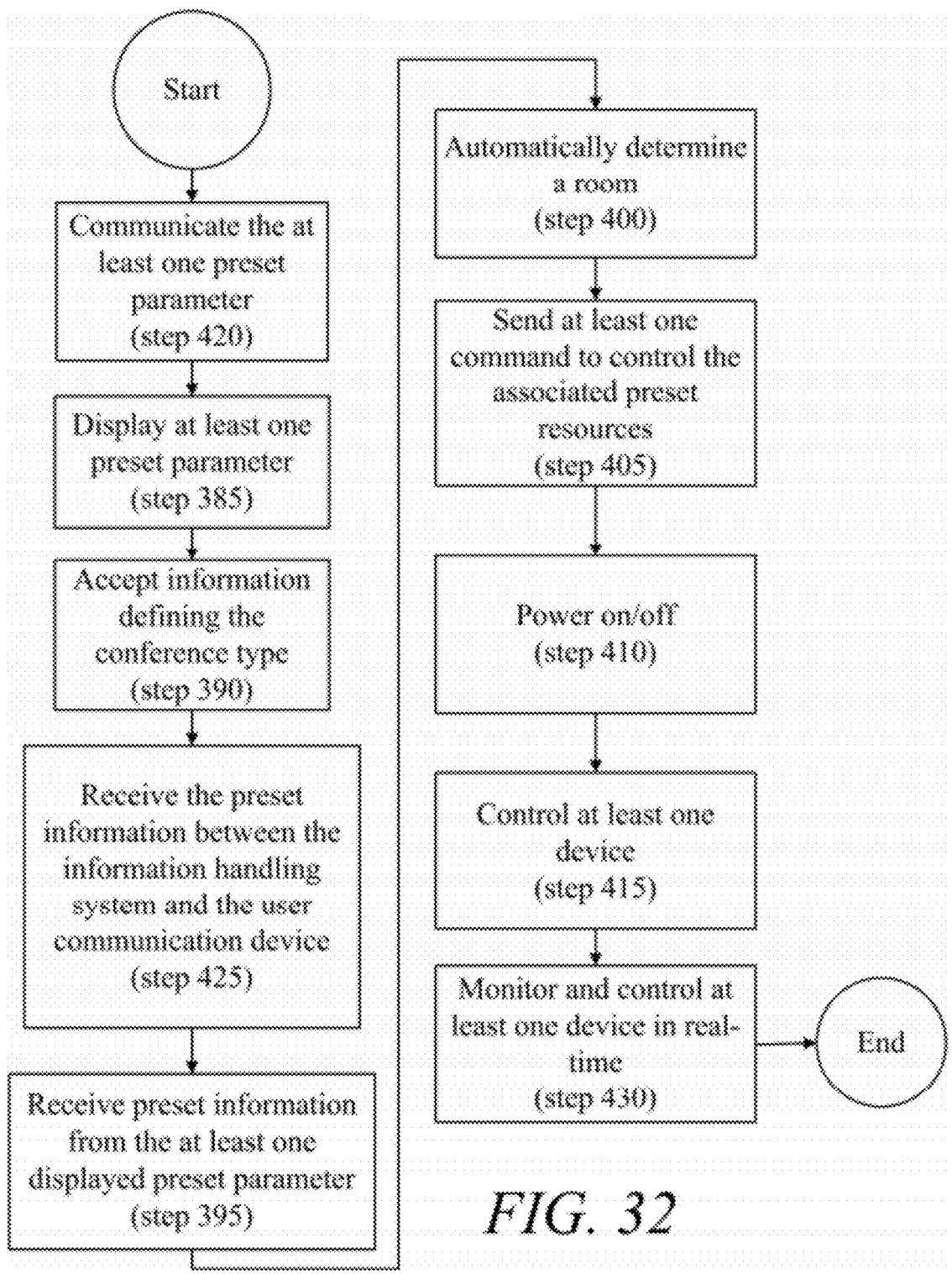

FIG. 32 illustrates a flowchart of a meeting management method including automated equipment setup in accordance with another illustrative embodiment of the present invention.

Figure 33:
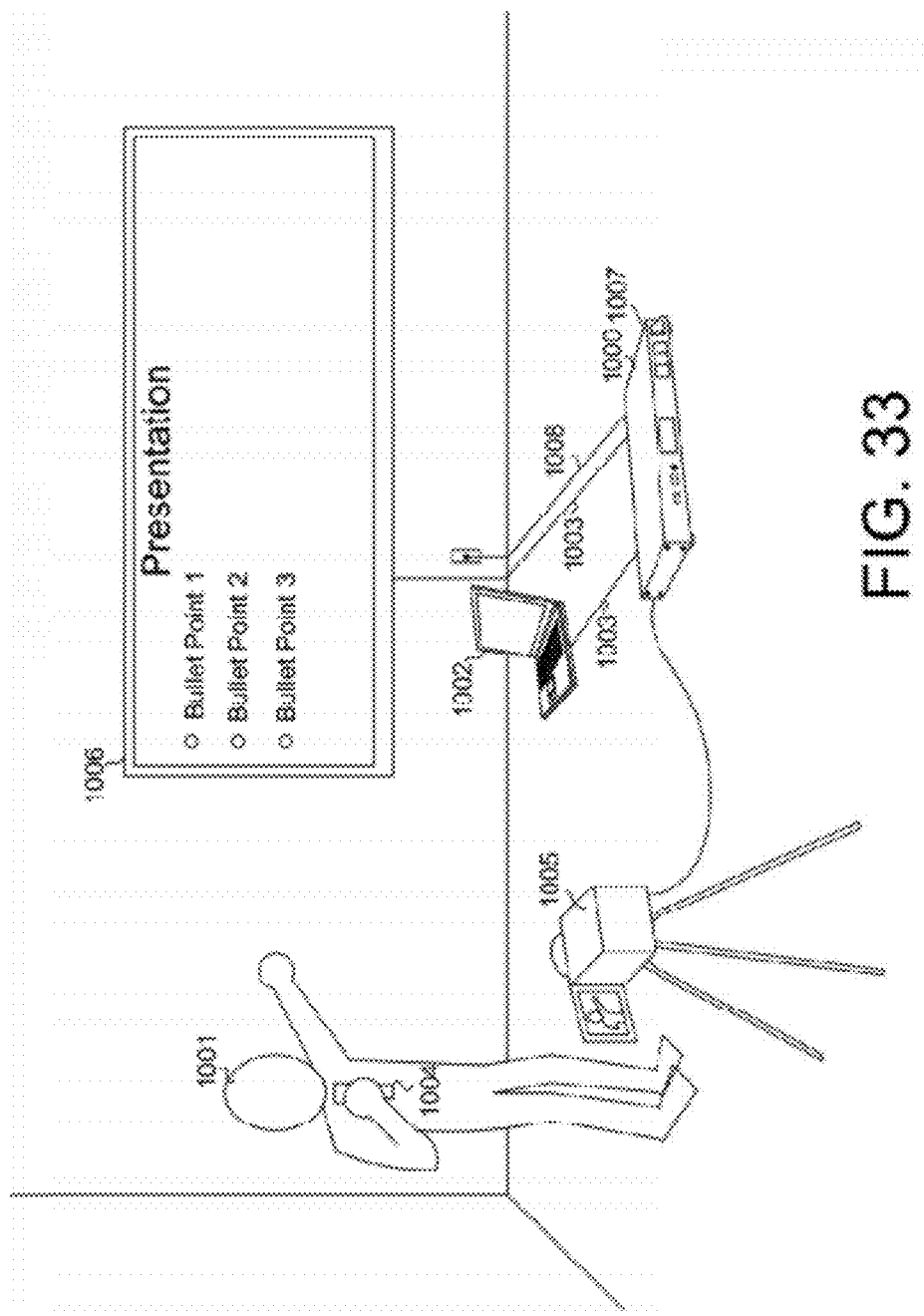

FIG. 33 depicts a presentation capture device in operation during a multimedia presentation, according to an embodiment of the invention.

Figure 34:
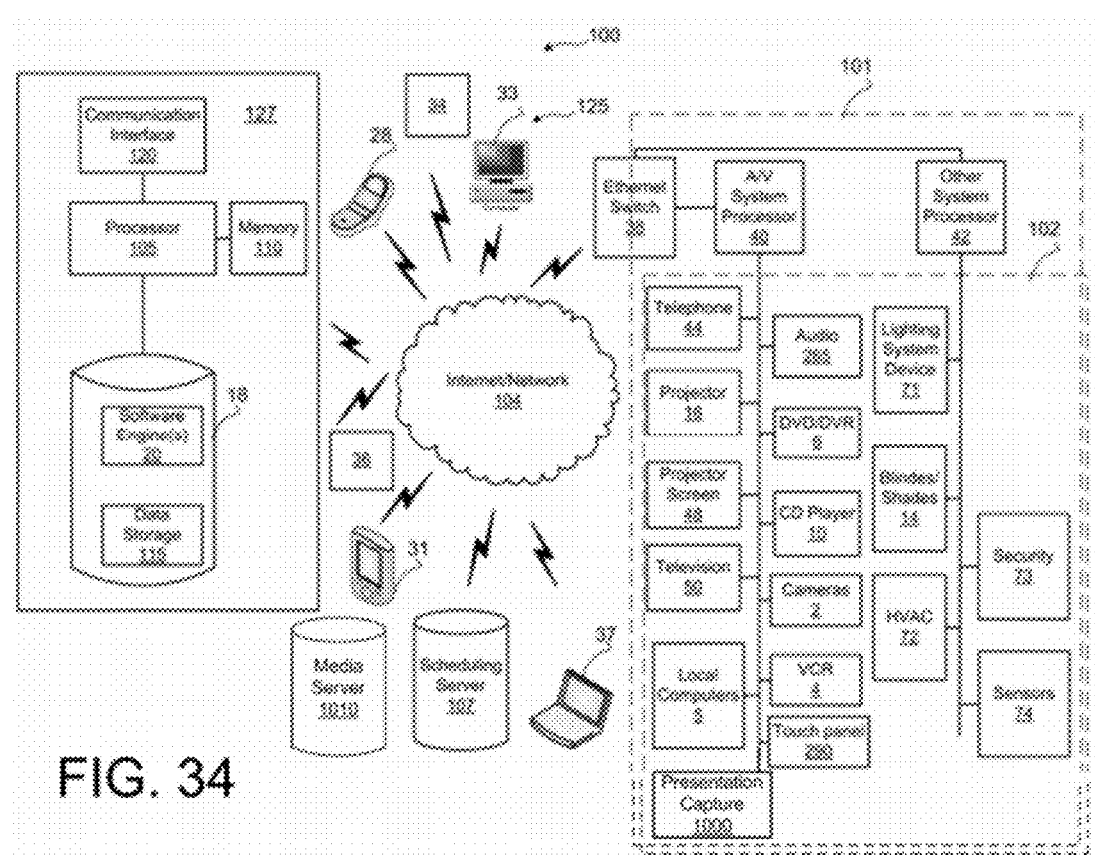

FIG. 34 is a schematic diagram depicting a system for managing, scheduling and initiating a conference room and/or conference room resources based on preset information in accordance with an embodiment of the invention.

Figure 35:
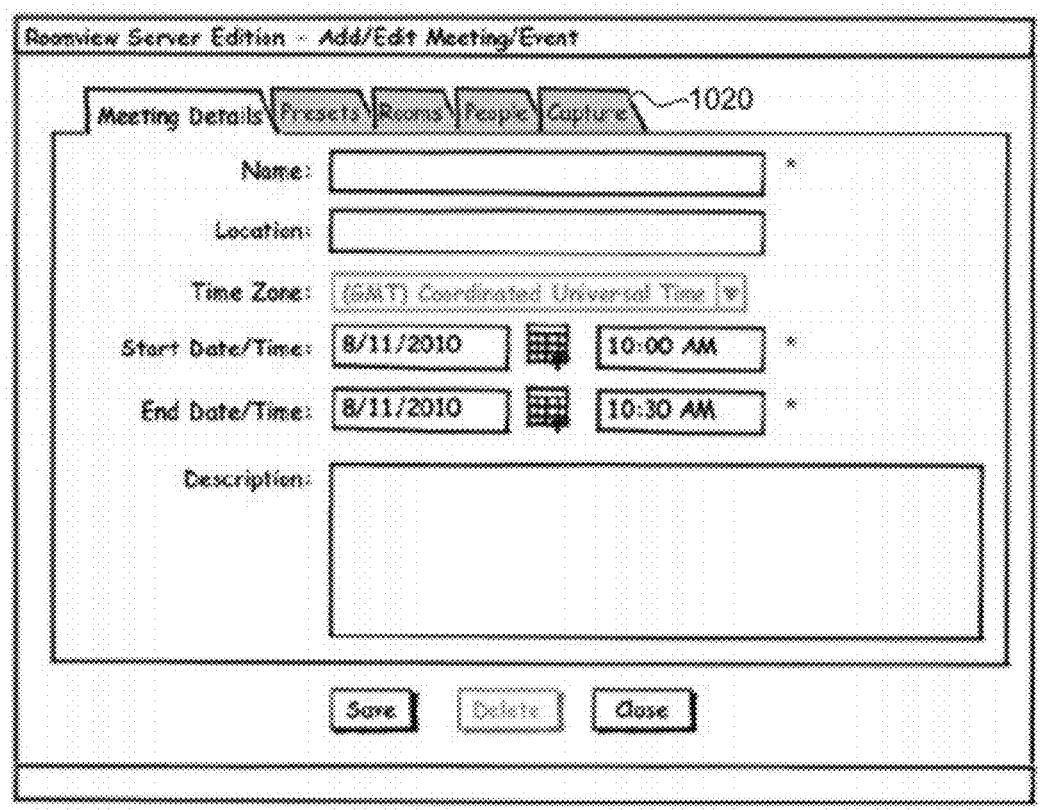

FIG. 35 shows a screen displaying a set of parameters in accordance with an embodiment of the invention.

Figure 36:
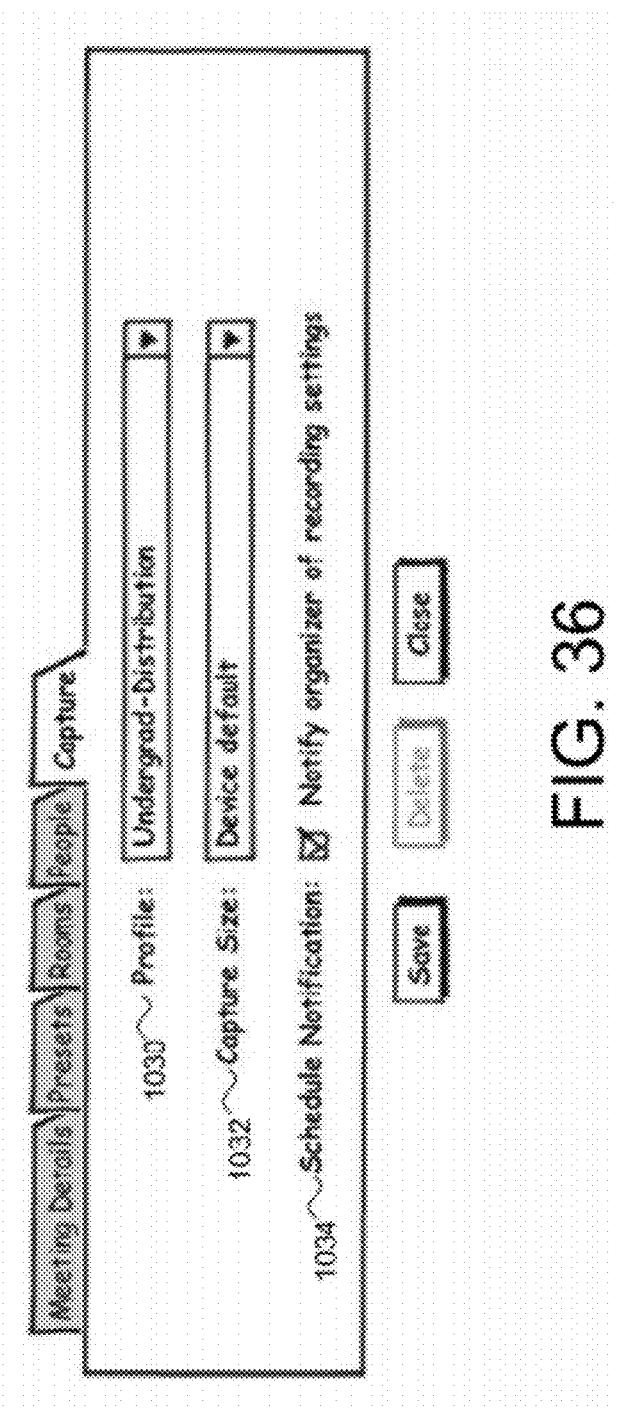

FIG. 36 shows a screen displaying a set of parameters in accordance with an embodiment of the invention.

Figure 37:
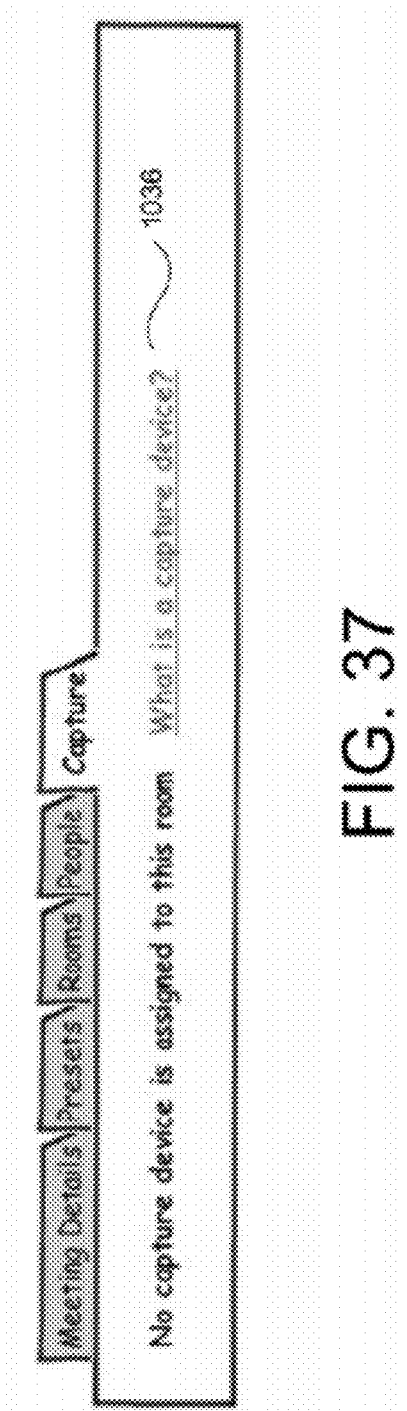

FIG. 37 shows a text notification page in accordance with an embodiment of the invention.

Figure 38:
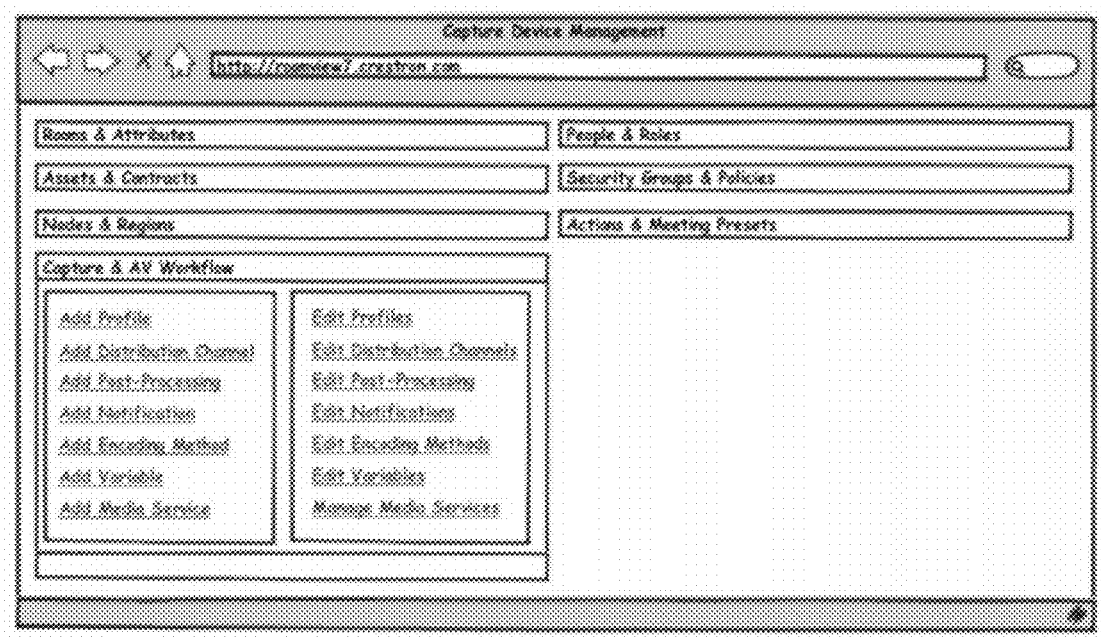

FIG. 38 shows a registration page showing links to preconfigure preset parameters in accordance with an embodiment of the invention.

Figure 39:
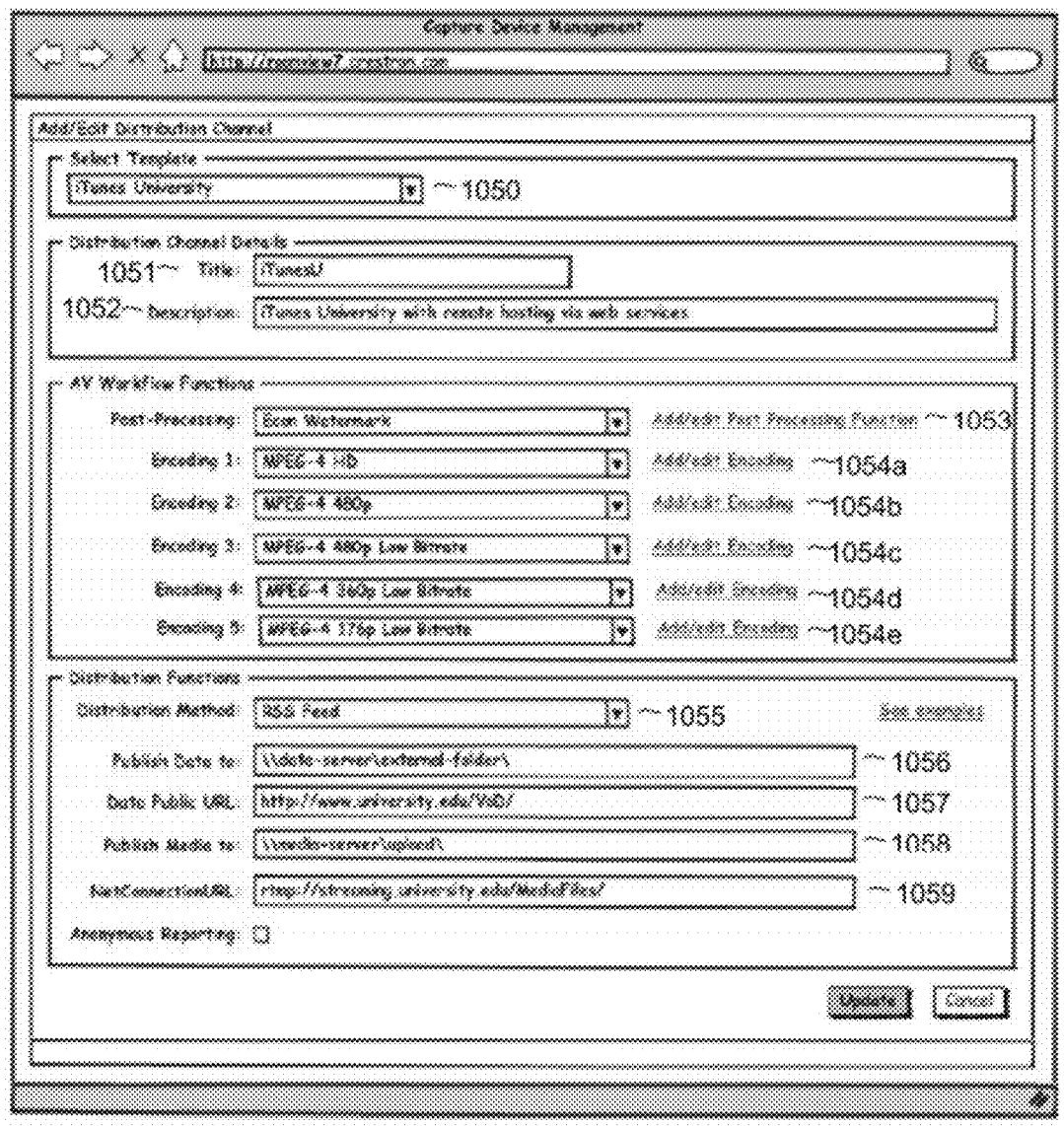

FIG. 39 depicts a setup menu showing the distribution channel parameters which may be preconfigured for a recording profile in accordance with an embodiment of the invention.

Figure 40:
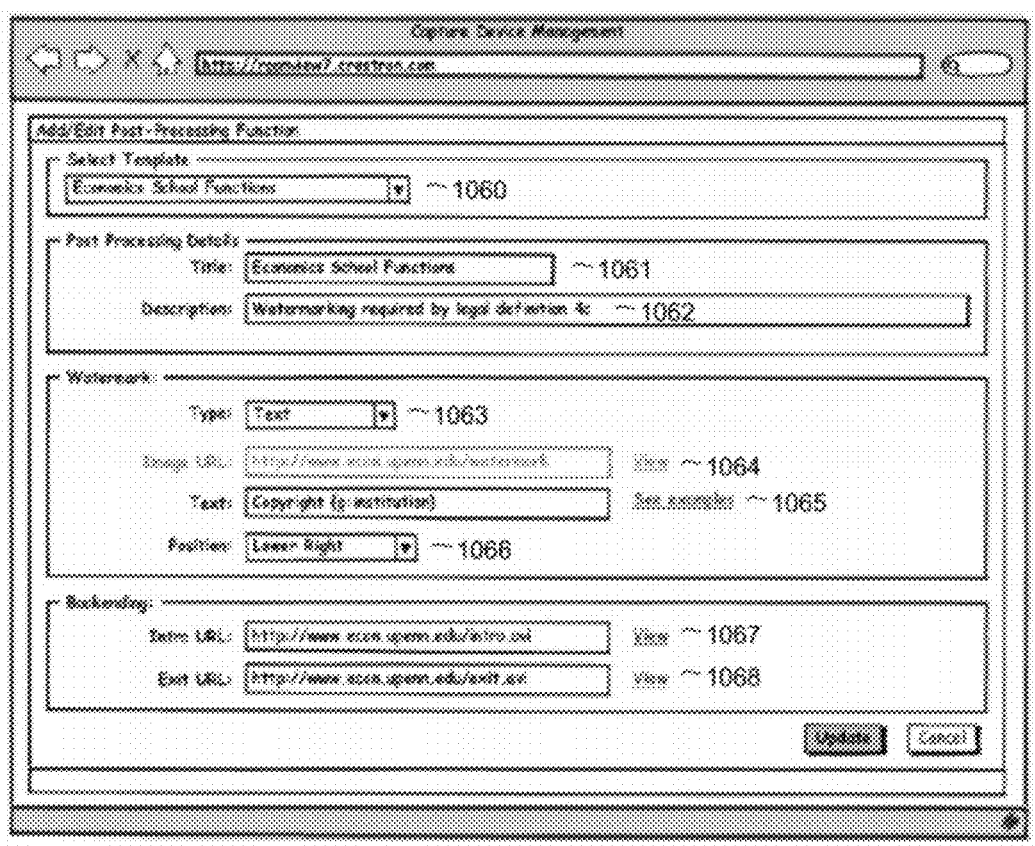

FIG. 40 illustrates a setup menu showing the post-processing parameters which may be preconfigured for a recording profile in accordance with an embodiment of the invention.

Figure 41:
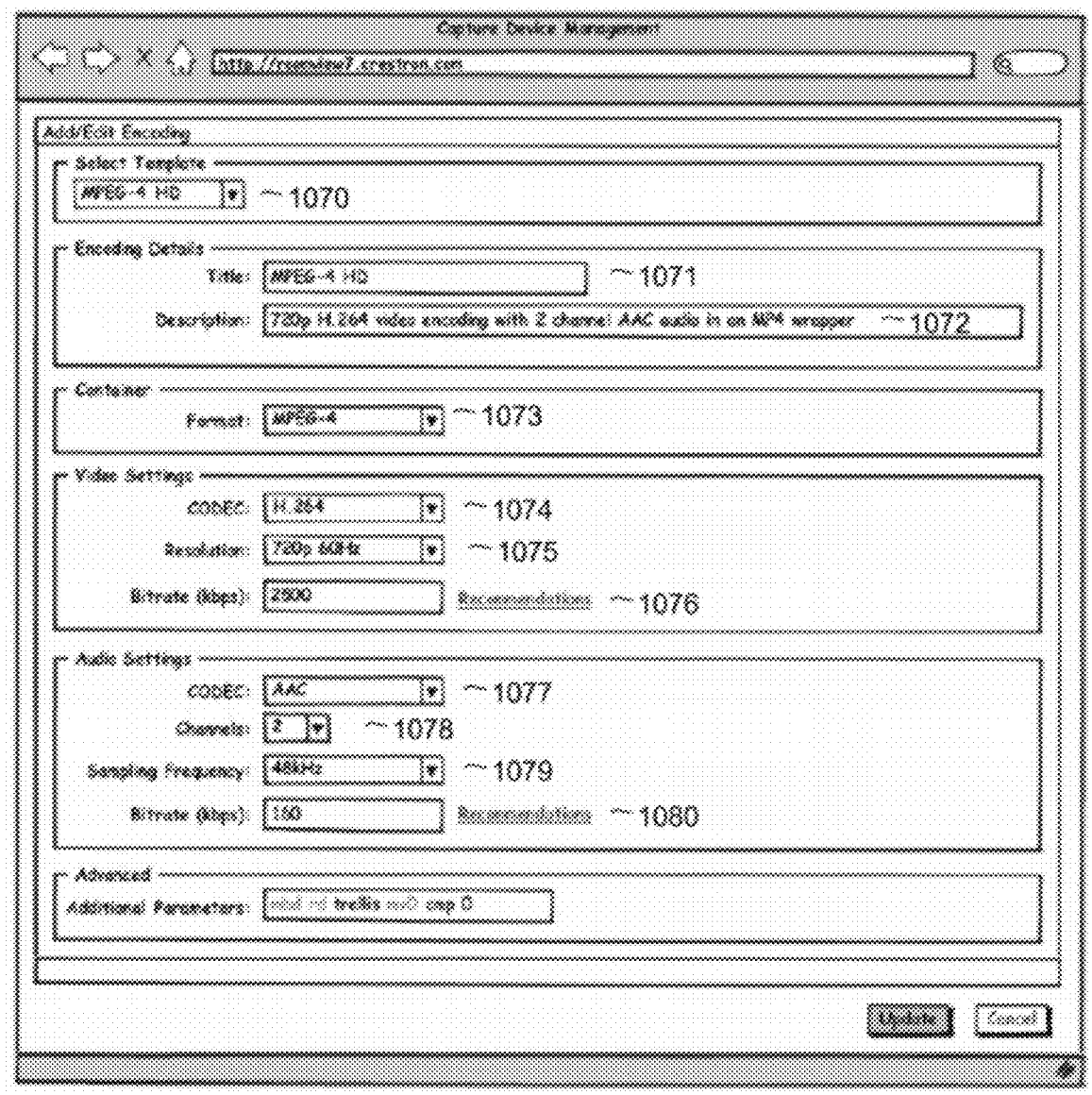

FIG. 41 depicts a setup menu showing the encoding parameters which may be preconfigured as part of a recording profile in accordance with an embodiment of the invention.

LIST OF REFERENCE NUMBERS FOR THE MAJOR ELEMENTS IN THE DRAWING

The following is a list of the major elements in the drawings in numerical order.
1 list of room content page
2 camera
4 VCR
5 local computer
6 DVD/DVR
10 cassette disk player
14 blinds/drapes
16 projector
18 storage device
20 software engine
28 mobile telephone
31 personal digital assistant
33 computer system
34 video display/conferencing system
36 touch panel
37 laptop computer
38 Ethernet
40 AV system processor
42 control system processor
44 telephone/speaker phone
46 presentation engine
48 projector screen
50 television
52 resource availability verification engine
54 notification engine
56 control engine
60 availability data storage
62 resource data storage area
66 user registration engine
68 preset association engine
70 availability data engine
71 lighting system device
72 heating, ventilating, and air conditioning system device
73 security devices
74 sensor
76 resource request and reservation engine
78 name of the event
80 location of the event 82 time zone
84 start date/time of the event
86 end date/time of the event
88 recurrence
90 description of the event
100 system
101 conference room
102 conference room resources
104 communication network
105 processor
107 scheduling server
110 memory devices
115 data storage area
120 communication interface
125 user communication device
127 computer/information handling system
130 type of conference
135 preset resources
140 preset parameter
145 preset information
150 start time of a meeting
155 end time of a meeting
165 scheduling server
170 user/conference initiator
175 command to control the preset resources
190 discussion meeting
195 presentation meeting
200 audio call meeting
205 video call meeting
210 audio and video call meeting
215 shared document file
220 phone number
225 passcode
235 date of a conference
240 welcome message
245 image
263 audio/visual equipment
265 audio system device
290 touch panel
385 step of displaying at least one preset parameter
390 step of accepting information defining the conference type
395 step of receiving preset information
400 step of automatically determining a room 101
405 step of sending at least one command
410 step of powering on/off
415 step of controlling at least one conference room device
420 step of communicating the at least one preset parameter
425 step of receiving the preset information
430 step of monitoring and controlling conference room device
435 profile content page
440 general preference page
445 email content page
450 plug-in content page
455 user's first name
460 user's last name
465 preferred theme
470 work hours
475 days
480 shared documentation file
485 language preference
490 time zone
495 email format
500 email address
505 sender's name
510 plug-ins
515 refresh rate
520 audible alert settings
525 instant message color
530 instant messaging
535 short messaging service
540 multimedia messaging service
545 email
550 overview content page
555 first sub-content page
556 second sub-content page
557 third sub-content page
558 fourth sub-content page
559 fifth sub-content page
560 sixth sub-content page
561 seventh sub-content page
562 eighth sub-content page
565 conference room name
570 severity level
575 issue message
580 time and date stamp
590 help request content page
595 severity level
600 time/date stamp of the help request
610 name of the device
615 help message
625 user's login name
635 the status of the conference room device
640 a serial number of the device
645 an asset tag of the device
650 a make of the device
655 a model of the device
660 last date of serviced for the conference room device 102
665 online status
670 graphical load
675 humidity level
680 volume level
685 temperature
690 error alert
695 screen status
700 light indicator
705 mute indicator
710 lift indicator
715 power indicator
720 help alert indicator
725 system power indicator
730 error message
735 free busy status indicator
737 calendar content page
738 event for the day
739 time
741 pop-up window
742 search feature
745 meeting type of meeting
750 event type of meeting
751 welcome message
752 image source
753 meeting type
754 shared document
780 shared documentation
785 phone number
790 passcode
791 video number
792 room web content page
793 people web content page
794 recurrence web content page
795 name of the meeting
796 location of the meeting 797 time zone
798 start time/date
799 description of the event
800 webcam
801 actions web content page
802 list of actions
803 offset
804 rooms web content page
806 recurrence web content page
815 title
820 URL link
830 drop down menu
835 power on/off button
1000 presentation capture device
1001 lecturer
1002 computer
1003 High Definition Multimedia Interface (HDMI) connection
1004 wireless microphone
1005 video camera
1006 digital sink
1007 Universal Serial Bus (USB) memory stick
1008 ethernet connection
1010 media server
1020 capture tab
1030 recording profile
1032 capture size
1034 notification preference
1036 text notification
1050 profile template
1051 profile title
1052 profile description
1053 post processing parameters
1054 encoding parameters
1055 distribution method
1056 publish data to
1057 data public URL
1058 publish media to
1059 NetConnectionURL
1060 post-processing template
1061 post-processing title
1062 post-processing description
1063 watermark type
1064 watermark image URL
1065 watermark text
1066 watermark position
1067 intro URL
1068 exit URL
1070 encoding template
1071 encoding title
1072 encoding description
1073 container format
1074 video CODEC
1075 video resolution
1076 video bitrate
1077 audio CODEC
1078 number of audio channels
1079 sampling frequency
1080 audio bitrate

DETAILED DESCRIPTION OF THE INVENTION

Mode(s) for Carrying Out the Invention

The present invention relates to the ability to manage, schedule, and initiate a conference room and/or conference room resources. More specifically, a user or conference organizer is able to schedule a conference room based on the type of meeting, which corresponds to a host of conference room resources (e.g., audio visual (AV) resources and environmental systems). The user 170 is able to schedule a room globally and monitor, control, and report conference room resources. The present invention provides an efficient point-and-click interface and a simple "at-a-glance" view of the entire control system network. Delivering both real-time personal computer (PC) and web-based clients, the present invention allows facility managers, users, media directors and information technology (IT) specialists to have real-time control and cross-platform accessibility in addition to true remote control and helpdesk functionality.

Referring to FIG. 1, an exemplary embodiment of a system 100 for managing, scheduling, and initiating a conference room 101 and/or conference room resources 102 based on preset information 145 (e.g., FIG. 3) in accordance with an illustrative embodiment of the present invention. It should be noted that the exemplary embodiment of system 100 illustrated in FIG. 1 may be varied in one or more aspects without departing from the spirit and scope of the teachings disclosed herein.

The system 100 includes computer or information handling system 127. The computer or information handling system 127 includes one or more processors 105. One or more memory devices 110 are operably coupled with the one or more processors 105. In general operation, processor 105 and memory 110 cooperate to execute and store, respectively, one or more instructions of a program of instructions as well as perform other operations. As will be further explained below, the computer information handling system 127 is configured to send at least one command 175 to control preset resources 135 once a conference room 101 with the preset resources 135 is reserved.

Computer or information handling system 127, as illustrated in FIG. 1, also includes one or more storage devices 18 operably coupled to processor 105. Storage device 18 includes one or more software engines 20 operable to enable the maintenance, management, scheduling, initiating, publication, presentation, provision and/or other data manipulation capability of resource availability and reservation information as well as perform other operations. Depending upon implementation, various aspects of teachings of the present invention may be implemented in a single software engine 20, in a plurality of software engines 20, in one or more hardwired components or in a combination of hardwired and software systems.

In addition to one or more software engines 20, storage device 18 also includes one or more data storage areas 115. Data storage area 115 is operably associated with the memory device 110 and processor 105. Data storage area 115 of storage device 18 may be leveraged to maintain data concerning the availability of one or more resources maintained for reservation, descriptive information concerning the one or more resources maintained for reservation, preset information 145, preset parameters 140, as well as other information pertinent to the management, maintenance, scheduling, initiating, publication, presentation and/or provision of resource availability and reservation information. Data storage area 115, or portions thereof, may also be utilized to store myriad other data.

Depending upon implementation, data storage device 18 may be implemented within a computer or information handling system 127, in a storage area network operably coupled to a computer or information handling system 127, and/or in other storage media, including removable media, compatible with and accessible by computer or information handling system 127. In one embodiment, the one or more software engines 20 and data storage areas 115 cooperate in the maintenance, management, scheduling, initiating, publication, presentation, provision and/or other manipulation of resource availability and reservation information, according to teachings of the present invention.

Computer or information handling system 127 also includes one or more communication interfaces 120. Communication interface 120 is operable to communicatively couple computer or information handling system 127 with one or more user communication devices 125 via one or more communication networks 104. Communication interface 120 is operably associated with the processor 105 and memory 110. Communication network 104 may be a personal area network, local area network, metropolitan area network, wide area network, an alternate network configuration or some combination of network types and/or topologies.

Communication interface 120 enables communications with a plurality of user communication devices 125 via communication network 104. User communication devices 125, which may be leveraged in accordance with teachings of the present invention include, without limitation, mobile telephone 28, personal digital assistant 31, computer system 33, video display/conferencing system 34, touch panel 36, laptop computer 37 as well as other communication enabled devices.

Communication network 104 may include one or more gateway devices (not expressly shown). User communication devices 28, 31, 33, 34, 36, 37 communicate with the gateway devices of communication network 104 just as computer or information handling system 127 communicates with the gateway devices. In this manner, user communication devices 28, 31, 33, 34, 36, 37 may be in selective communication with computer information handling system 127 via the gateway devices and communication network 104.

The gateways of communication network 104 preferably provide user communication devices 28, 31, 33, 34, 36, 37 and computer or information handling system 127 with an entrance to communication network 104 and may include software and/or hardware components to manage traffic entering and exiting communication network 104 and conversion between the communication protocols used by user communication devices 28, 31, 33, 34, 36, 37, computer or information handling system 127 and communication network 104. In certain embodiments, the gateways of communication network 104 may function as a proxy server and a firewall server for user communication devices 28, 31, 33, 34, 36, 37 as well as computer or information handling system 127. Further, the gateways may be associated with a router (not expressly shown) operable to direct a given packet of data that arrives at a gateway and a switch (not expressly shown) operable to provide a communication path into and out of each gateway.

In one embodiment, communication network 104 may be a public switched telephone network (PSTN). In alternate embodiments, communication network 104 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks. In addition, other network embodiments can be deployed with many variations in the number and type of devices, communication networks, the communication protocols, system topologies, and myriad other details without departing from the spirit and scope of the present invention.

In one embodiment, user communication devices 28, 31, 33, 34, 36, 37 may include a variety of forms of equipment connected to communication network 104 and accessible to a user 170. User communication devices 28, 31, 33, 34, 36, 37 may be, employ or include telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user 170. User communication devices 28, 31, 33, 34, 36, 37 may be equipped for connectivity to communication network via a PSTN, DSLs, cable network, wireless network, or other communication channel.

The AV control system processor 40 is connected to various conference room devices 102 via a wire line or wireless connection. The conference room devices 102 include various types of audio/visual equipment 263. For example, audio/visual equipment 263 includes, but is not limited to, cameras 2, VCR 4, audio system device 265, DVD/DVR 6, telephone 44, projector 16 and projector screen 48, CD player 10, touch panel 290, one or more local computers 5, cable television box (not shown), and television 50 such as plasma, liquid crystal display, light-emitting diode flat panel, and cathode ray tube television.

The AV control system processor 40 may be a Crestron 2-Series Control system available from Crestron Electronics, Inc. of Rockleigh, N.J. The Crestron 2-Series Control system provides a complete integrated AV or automation solution. Every audio, video, and environmental element of the conference room 101 becomes integrated and accessible through the AV system processor 40.

Control system processor 42 is used control various devices, for example, security devices 73 (e.g., door locks), lighting system devices 71, blinds/drapes 14, Heating, Ventilating, and Air Conditioning (HVAC) system devices 72, and sensors 74 such as motion sensor.

The AV control system processor 40 and/or control system processor 42 may include an Ethernet 38 for communication purposes via the network 104.

The information handling system 127 communicates with a scheduling server 107 to upload and/or download one or more aspects of availability data associated with a resource to be maintained for reservation. For example, a user 170 may upload or download information concerning one or more resources from or to one or more applications maintained by the user 170 on a local computer, personal digital assistant, or other information handling system as well from a user 170 maintained network site such as a web-based calendaring application or another content site. Examples of applications or utilities from which information may be uploaded or to which information may be downloaded another, without limitation, Microsoft Outlook®, Yahoo! Calendar®, Lotus Notes®, as well as other calendaring applications.

Referring now to FIG. 2, one embodiment of a collection of software engines 20 and data storage areas 115 is shown according to teachings of the present invention. As mentioned above, the number of software engines 20 and data storage areas 22 may be varied and, as such, the specific arrangement discussed herein is presented primarily for descriptive purposes.

As illustrated in FIG. 2, data storage area 115 of data storage device 18 may include one or more resource availability data storage areas 60. Resource availability data storage area 60 includes data pertaining to times, dates or other information concerning when a resource may be reserved. In one embodiment, resource availability data storage area 60 may cooperate with other data maintained in one or more data storage areas 115 as well as one or more software engines 20. Data storage area 115 also includes one or more resource data storage areas 62.

Resource data storage area 62 is operable to maintain data concerning one or more aspects of information regarding a resource maintained for reservation. In addition, data storage area 62 also includes, for example, various preset parameters 140, preset information 145, preset resources 135, and conference type 130. In general, preset resources 135 are conference room devices 102 such as video projector 16, CD player 10, touch panel 290, audio 265, camera 7, DVD/DVR player 6, VCR 4, lighting system device 71, touch panel 290, blinds/shades 14, HVAC system 72, security system 73, sensor system 74, and local computer 5 (FIG. 1). In general, preset parameters 140 (e.g., FIG. 3) are information related to the meeting or conference. For example, preset parameters 140 could include start and end time 150, 155 of the conference, meeting and event types 745, 750, discussion 190, presentation 195, audio call 200, video call 205, audio and video call 210, shared documentation 780, phone number 785, passcode 790, and video number 791 (FIGS. 13, 15 and 19). These preset parameters 140 will be further explained below. In general, preset information 145 is information from the preset parameters 140 received from the user 170. For example, preset information 145 is the actual time (i.e., 8:30 AM) in response to the preset parameter 140 of the meeting start time 150. It should be understood that preset parameters 140, preset information 145, preset resources 135, and conference type 130 may include other data/information that is programmable depending upon the various aspects of the teachings of the present invention. For example, images, descriptive information, as well as other information regarding a resource maintained for reservation may be stored in resource data storage area 62. Further, resource data storage area 62 includes information defining relationships between resources, such as relationship details among preset resources 135 (e.g., FIG. 1), preset information 145 (e.g., FIG. 3), and preset parameter 140 (e.g., FIG. 3). Additional information may be maintained in resource data storage area 62 without departing from the spirit and scope of teachings of the present disclosure.

Teachings of the present invention may be implemented or effected using a variety of components and/or techniques. In an exemplary embodiment of the present invention, one or more software engines 20 may be leveraged in the maintenance, management, scheduling, initiating, publication, presentation and/or provision of preset resources availability and reservation system. As such, according to teachings of the present invention, one or more software engines 20 preferably associated with computer or information handling system 127 cooperate to achieve and effect teachings discussed herein.

As illustrated in FIG. 2, an exemplary embodiment of the present invention may include user registration engine 66. User registration engine 66 requires or requests a variety of data from a user during a registration process. For example, requests for data may include the user's name and password for registration purposes. In addition to performing such conventional user registration tasks as requiring or requesting a user to create a user name and/or password, an embodiment of user registration engine 66 employed by computer or information handling system 127 (FIG. 1) preferably requires or requests a registering resource provider to submit availability data as to one or more resources the resource provider desires to maintain for reservation. In addition, user registration engine 66 may also request or require that a resource provider submit information describing the one or more resources to be maintained for reservation. Further, user registration engine 66 may request or require that a resource provider set desired access rights for resource requesters seeking to view the resources maintained for reservation by the resource provider.

Various other data may be gathered from a registering user 170 by a user registration engine 66 incorporating teachings of the present invention. It should be noted that user registration engine 66 may leverage one or more additional software engines 20 in the performance of the exemplary operations discussed above and that in operations discussed, with respect to certain circumstances, user registration engine 66 may be supplanted by alternative software engine 20 functionality.

In addition to user registration engine 66, an example embodiment of a system, method and software incorporating teachings of the present invention also includes preset association engine 68. Preset association engine 68 provides preset parameters 140 to be displayed and defines the association between the preset resources 135 and the preset information 145 obtained by the user from the preset parameters 140. For example, the information handling system 127 displays a preset parameter 140 such as asking for a conference type 130 and providing options such as a meeting or an event type of conference. The user 170 seeking to make one or more resources available for reservation may select, for example, a meeting type 745. The preset association engine 68 associates the meeting type (preset information 145) with a list of more preset parameters 140 and/or resources (e.g., conference room devices 102). Once the user 170 chooses the type of conference 130, another preset parameter 140 is requested for the user 170 to enter additional preset information 145. Referring to FIGS. 13 and 15, for example, if the user 170 chooses a meeting type 745, another preset parameter 140 is prompted to request the user 170 to enter a type of meeting type 745 such as discussion 190, presentation 195, audio call 200, video call 205, or audio and video call 210. If the user 170 chooses audio and video call 210, another preset parameter 140 of upload shared document 215 is requested of the user 170. The preset association engine 68 may then associate the audio and video call 210 with preset resources 135 (e.g., conference room devices 102). Referring to FIG. 1, in this example, the preset resources 135 are telephone 44, video projector 16, camera 2, and computer 5. It should be understood that the preset resources 135 may be altered depending upon the various aspects of the teachings of the present invention.

Referring back to FIG. 2, the preset association engine 68 operates with an availability data engine 70 as well as other software engines 20, to determine a conference room 101 that has the required preset resources 135 for the audio and video call 210 and reserve such conference room 101. The availability data engine 70 also includes a synchronization function that enable users to maintain coherency between a portable or local calendaring utility or application and a publicly accessible resource availability and reservation system. Synchronization capabilities also include functionality operable to resolve conflicts between a user's 170 calendaring utility and availability scheduling maintained by the resource availability and reservation system.

The software engine 20 also includes a presentation engine 46. In general, the presentation engine 46 may be leveraged in association with one or more included software engines 20 and data available in data storage area 115 to enable visual layout and presentation structure of a management resource reservation, real-time diagnostic and control content pages. For example, presentation engine 46 may enable general content site presentation of one or more resources maintained for 1) reservation, 2) preset parameter 140, 3) real-time diagnostic, control, and monitor of conference room devices 102, 4) one or more search features or viewer customization presentation features, 5) user communication device formatting, as well as other aspects of delivering resource availability and reservation information to a viewer or registered user 170 via a content site. FIG. 3 through FIG. 30, discussed below, include embodiments of content pages whose presentation and layout may be effected using one or more content presentation engines such as presentation engine 46.

Software that produces the content pages of FIG. 3 through FIG. 30 in conjunction with the information handling system 147 may be RoomView available from Crestron Electronics, Inc. of Rockleigh, N.J. RoomView is a powerful AV asset management software tool that enables the user 170 to keep track of all rooms 101 in the facility. While connected to each room 101, RoomView displays system and projector power status, lamp life, alerts and other vital statistics as will be further discussed below. This graphic-rich interface empowers AV managers to intelligently manage and support every room 101. Without RoomView, support staffs must roam hallways to check room status, manually view and record projector lamp life, provide in-person help to users 170, and turn off systems one by one at the end of each day. From the main screen of FIGS. 3-30, a user 170 can instantly see the status and vital statistics of every room 101. For example, at a glance, the user 170 is able to determine projector lamp life and room occupancy. It should be understood that the applications of FIGS. 3-30 are completely customizable. The software application allows the user 170 to view and control any system attribute such as power, volume, source, lights, and room temperature.

The system 100 is able to analyze data collected over time and view the result in real-time. The system 100 logs every change and the time at which it occurred. Determining room usage or most common sources is easy with the built-in reporting tool. The system 100 also provides more effective technical support. From any room, users 170 can call for help from a touch panel 290, keypad, or other user interface. Help messages popup alerting technicians that aid is needed. The help messages quickly provide assistance or notify users 170 that help is on the way with a simple chat window that is displayed on the touch panel 290.

In addition, the system 100 enables AV managers to take complete control of any room, right from the help desk. A window within the software displays a room's virtual touch panel 290. Instead of having to run across campus, the system 100 provides help within seconds remotely from anywhere on or off site with increase response time and customer satisfaction with less staff.

Sometimes the most difficult problems to troubleshoot are the ones that cannot be seen. The system 100 is able to monitor hundreds of rooms 101, for example, if a projector 16 is overheating or a DVD player 6 is randomly shutting off. Problems like these sometimes require hours of time in the room. The system 100 also can send alerts via email, IM, SMS, and other notification protocols. Such alerts can be that knowing when a room is occupied and powered on or if a touch panel 290 was disconnected. The system 100 can monitor conference devices 102 such as time to replace projector lamps when they've reached critical levels. IT specialist can get emails when users 170 request help, saving the back-and-forth trips to and from the help desk. Built-in network connectivity provides instant status and remote technical support so the class or meeting is never interrupted.

The software engine 20 also includes a resource request and reservation management engine 76. In one embodiment, the resource request and reservation management engine 76 is employed to monitor and ensure compliance with reservation criteria established by the providers of the resources available for reservation. Further, resource request and reservation management engine 76 may be employed to monitor and ensure compliance with one or more reservation linking requirements requested by a provider of one or more resources available for reservation. In addition, resource request and reservation management engine 76 may, such as through cooperation with notification engine 54, be operable to notify a resource provider of a resource reservation request, to notify a resource requester as to the status of a reservation request for a selected resource, generate one or more meeting requests or reminders indicative of the resource reservation, as well as perform other tasks.

Resource availability verification engine 52 may also be included in an embodiment of the present invention. In one aspect, resource availability verification engine 52 may be used to perform one or more checks on resources maintained for reservation to ensure that postings regarding such resources accurately reflect substantially current or up-to-date availability. In another aspect, resource availability verification engine 52 may, upon receipt of a resource reservation request, verify that a selected resource remains available and has not been reserved in the interim period between a posting of the selected resource's reservation availability and the time when a user 170 makes or initiates a reservation request process. Other operations and benefits may flow from a resource availability verification engine incorporating teachings of the present invention.

In addition to or in lieu of one or more software engines 20 discussed above, notification engine 54 may also be included in an exemplary embodiment of the present invention. Notification engine 54, according to teachings of the present invention, may be employed to provide real-time status information of resources in each conference room 101 including the preset resources 135 such as environmental resources and conference room devices 102. The notification engine 54 may notify a resource requester or other people such as IT specialist as to the status of the submitted reservation requests and/or acknowledged reservations.

Notification engine 54 may also be leveraged to deliver messages sent between various people such as a user 170 from one conference room 101 to an IT specialist. For example, notification engine 54 in cooperation with other engines 20 and information handling system 127 may provide instant messaging service 530, short messaging service 535, multimedia messaging service 540, or email 545. It may be appreciated that other situations exist in which a notification would be preferred or required. As such, a variety of other notifications may be performed by notification engine 54 included in an exemplary embodiment of the present invention without departing from the spirit and scope of the teachings discussed herein.

The software engines 20 also include a control engine 56. In general, the control engine 56 may be leveraged in association with one or more included software engines 20 and data available in data storage area 115 to send at least one command 175 to control the associated preset resources 135 once the conference room 101 with the preset resources 135 is reserved. Referring to FIG. 1, for example, the control engine 56 sends a command 175 to control the associated preset resources 135 in response to the start 150 and end time 155 of the conference. The at least one command 175 includes a command to power on/off the video projector 16, CD player 10, touch panel 290, audio 265, camera 2, DVD/DVR player 6, and VCR 4. The at least one command 175 may also include a command to display and power on/off or dim the lighting system device 71, control the touch panel 290, raise/lower the blinds/shades 14, power on/off or adjust the temperature of the HVAC system 72, enable/disable the security system 73, power on/off or move the sensor system 74, and power on/off local computer 5. Depending upon implementation, other control commands 175 are contemplated by the present invention.

A number of software engines 20 are discussed in reference to FIG. 2. Such discussion is exemplary and not intended to be an exhaustive listing of potentially useful capabilities. For example, other engines may provide software and firmware updates, database wide searching, pop-up, voice, and phone calls. One or more of the software engines discussed above may be combined or divided and additional software engines 20 may be included in an implementation of the present invention. Further, the discussion of FIG. 3 through FIG. 30 may suggest a variety of additional software engines 20 contemplated by the present invention.

FIG. 3 is a schematic diagram depicting a profile content page 435 for a system 100 for management of conference room preset. The profile content page 435 includes at least three sub-content pages 440, 445, 450. The first sub-content page 440 of the profile content page 435 includes preset parameters 140 about the user 170 such as the user's first and last name 455, 460, preferred theme 465, work hours 470 and days 475, shared document file 480, language preference 485, and time zone 490. When the user 170 selects a particular preset parameter 140, there may be one or more options for the user 170 to further select. For example, when a user 170 selects the language preference 485, there may present further selections such as English, Chinese, French, or Spanish. The user's selection, for example, English, is the preset information 145. Moreover, user 170 selection of a particular preset parameter 140 may leverage one or more aspects of the preset association engine 68, availability data engine 70, presentation engine 46, and/or one or more other software engines 20 as well as one or more aspects of availability data storage 60, resource data storage 62 and/or other data.

FIG. 4 is one embodiment of the second sub-content page 445. The second sub-content page 445 may be a profile content page 435 that includes preset parameters 140 such as a selection of email format 495, email address 500, and sender's name 505.

FIG. 5 is one embodiment of the third sub-content page 450 of the profile content page 435. The third sub-content page 450 includes preset parameter 140 for plug-ins 510. A plug-in is a special kind of software component that adds specific capacities to a larger software application. A plug-in typically cannot be executed alone, but instead relies on the larger software application. If the plug-in is supported by the software application, it enables customizing the functionality of an application. For example, plug-ins may be include refresh rate 515, audible alert settings 520, instant message color 525, instant messaging 530, short messaging service (not shown), multimedia messaging service (not shown), email (not shown), software and firmware updates (not shown), database wide searching (not shown), pop-up (not shown), voice (not shown), and phone call (not shown). Other plug-ins 510 are contemplated and customizable by the present invention depending on the implementation.

Referring to FIGS. 6-7, a schematic diagram depicting an overview content page 550 for an embodiment of a system for management of conference room preset. The overview content page 550 includes a drop down menu 830 of at least one power on/off button 835 associated with at least one conference room device 102. For example, the drop down menu 830 includes several actions including "Apply Action", "Display Power Off", "Display Power On", "System Power Off", and "System Power On". The actions can be applied to one or more conference room 101. The system 100 can power up and power down on schedule, eliminating the need for personal visits to each space. The user 170 is able to save money and energy by ensuring that projectors are not left on after hours. For example, all projectors 16 throughout the facility can be turned off at the end of the day, saving energy and preserving lamps.

The overview content page 550 also includes at least eight sub-content pages 555, 556, 557, 558, 559, 560, 561, 562. The first sub-content page 555 may be the "My RoomView" web content page of the overview content page 550, which includes preset parameters 140 such as a status of the conference room 101. The status of the conference room 101 includes the conference room name 565 and associated with each conference room name 565, a severity level 570, an issue message 575, and a time and date stamp 580 of the issued message. The issue message 575, for example, may be a message to indicate that the room is hot and/or the humidity is low or high. The first sub-content page 555 also includes a help request content page 590. The help request content page 590 includes a severity level 595, time and date stamp 600 of the request for help, the at least one conference room name 565, a help message 615, an organizer's name 170, and a user's login name 625.

FIG. 8 is the second sub-content page 556 of the overview content page 550. The second sub-content page 555 may be an "Assets" web content page that includes preset parameters 140 of the conference room devices 102. The "Assets" web content page keeps track of equipment with the asset manager. Knowing when the devices 102 require maintenance, where they're located, and when it is time for replacement are important to prevent device failures. Email alerts can inform the appropriate parties of service contract expiration and full product depreciation. The "Assets" web content page includes, for example, for each conference room device 102, a name of the device 610, the status of the conference room device 635, a serial number 640, an asset tag 645, a make 650, a model 655, and a last date of service 660. This information, in particular the status of the conference room device 102, assists the user 170 and/or IT specialist to intelligently mange and support every conference room device 102 in every conference room 101 in real-time.

FIGS. 9-11 illustrate the third sub-content page 557 of the overview content page 550. The third sub-content page 557 is a status page that includes preset parameters 140 for each conference room 101. Each conference room 101 is filtered by the type of room or campus location. For example, if the user 170 selects "InfoComm 2010 University" in the room content page 1 of the overview content page 550 (See FIG. 6), the third sub-content page 557 lists all the conference room 101 as shown in FIG. 9. However, if the user 170 selects "Campus Rooms" in the room content page 1 of the overview content page 550 (See FIG. 6), the third sub-content page 557 lists only the conference rooms 101 that are "Campus Rooms" (in this example "Auditorium" and "Meeting Room)".

Continuing to FIGS. 9-11, the preset parameters 140 for each conference room 101 include the name of the conference room 565, an online status 665, at least one graph showing the load (graphical load) 670, humidity level 675, volume level 680, temperature 685, error alert 690, screen status 695, at least one light indicator 700, mute indicator 705, lift indicator 710, display power indicator 715, help alert indicator 720, system power indicator 725, error message 730, and free busy status indicator 735.

FIG. 12 illustrates the fourth sub-content page 558 of the overview content page 550. The fourth sub-content page 558 may be a "schedule" content web page. The fourth sub-content page 558 includes a calendar 737 for the user 170 to schedule a conference. The calendar 737 can be viewed by the day, week, or month. Events for a specific day are indicated textually as generally indicated by the reference numeral 738 (as shown on Wednesday, Mar. 30, 2011) and time as generally indicated by the reference numeral 739 (as shown on 12 AM-4 AM). The calendar 737 may also include a search feature 742 to locate an event.

In operation, the user 170 may click on the calendar 737 to create a conference. Referring to FIG. 13, a pop-up window 741 with preset parameters 140 are displayed. In one embodiment, the pop-up window 741 includes the preset parameter 140 asking for "What will this meeting be?" The user 170 picks either meeting 745 or event 750 type of conference and the user's choice is the preset information 145. If the user 170 chooses the event 750 type of conference, another set of preset parameters 140 are displayed on a screen of the user 170 communications devices 28, 31, 33, 34, 36, 37 as shown in FIG. 14. The preset parameter 140s solicit the name of the event 78, location of the event 80, time zone 82, start/date of the event 84, end date/time of the event 86, whether the event is a recurrence event 88, and a description of the event 90. Again, the user's responses to the preset parameters 140 are preset information 145 that are used to associate with resources. The associated resources are preset resources 135 that are reserved for the event 750 conference type. The resources are conference room resources such as conference room devices 102 or other type of resources that are programmable depending upon the various aspects of the teachings of the present invention. In this example, the resource may be a conference room 101 for the event 750 type conference.

If the user 170 selects the meeting 745 type of conference as shown in FIG. 13, another set of preset parameters 140 are displayed on the screen as shown in FIG. 15. The preset parameters 140 are associated with the conference type 130. The preset parameters 140 include the type of meeting 753 such as discussion 190, presentation 195, audio call 200, video call 205, and audio and video call 210. The preset parameters 140 may also include a "welcome message" 751 and "image source" 752 for sharing and/or displaying. For each meeting type 753, there is another set of preset parameters 140. For example, if the user 170 selects a "presentation" meeting type 195, the preset parameter 140 includes shared document 754 as shown in FIG. 16. This shared document 754 is available for the presentation. The information handling system 127 will then determine a room 101 that includes preset resources 135 such as a computer 5, lighting system 71, and projector 16 to display the presentation. The preset information 145 obtained from the preset parameter 140 is associated with a need for a computer 5, lighting system 71, and projector 16 for the presentation type of meeting 195. The information handling system 127 automatically sends at least one command 175 to turn on the lights in the determined conference room 101 and power on the computer 5 and projector 16 to display the shared document 754. In this example, the user 170 will save setup time because the user 170 will not have to turn on the lights or setup the computer 5 and projector 16 to display the shared file 754 since this will be done automatically. Moreover, the shared file 754 is shared with the conference participants and therefore saves the user 170 the time and effort of emailing every participant the file 754.

In another embodiment, the user 170 selects the "Audio Call" type of conference, another set of preset parameters 140 are displayed on the screen as shown in FIG. 17. The displayed preset parameters 140 include the shared document 754, phone number 785, and passcode 790 for access into the audio call 200. Based on the present information 145 that is received from the user 170 in response to the preset parameter 140, the information handling system 127 associates the preset parameter 140 with the required conference room resources. In this particular example, the conference room resources are a computer 5, speaker phone 44, lighting system 71, projector 16 and projector screen 48. The information handling system 127 will further determine an available conference room 101 and reserve such conference room 101 with the preset resources 135 (e.g., computer 5, speaker phone 44, lighting system 71, projector 16 and projector screen 48). At the start time 150 of the conference, the information handling system 127 sends at least one command 175 to power on the lighting system 71 and projector 16, lowers the projector screen 48, display the shared file 754 onto the projector screen 48, and dial into the audio call using the phone number 785 and passcode 790. The user 170 comes to the conference room 101 without having to setup the audio call.

In another embodiment, the user 170 selects the "Video Call" type of conference 205, another set of preset parameters 140 are displayed on the screen as shown in FIG. 18. The displayed preset parameters 140 include the shared document 754 and video number 791. Based on the present information 145 that is received from the user 170 in response to the preset parameter 140, the information handling system 127 associates the preset parameter 140 with the required conference room resources. In this particular example, the conference room resources are computers 5, webcams 800, HD cameras 2, headsets (not shown), projector screen 48, lighting system 71, and conference room microphones (not shown). The information handling system 127 will further determine an available conference room 101 and reserve such conference room 101 with the preset resources 135 (e.g., computers 5, webcams 800, HD cameras 2, headsets (not shown), projector screen 48, lighting system 71, and conference room microphones (not shown)). At the start time 150 of the conference, the information handling system 127 sends at least one command 175 to power on the various preset resources 135, adjust the lighting system 71, dial the video number 791, and lower the projector screen 48. The user 170 comes to the conference room 101 without having to setup the video call. The video connection is established for the video call.

In another embodiment, the user 170 selects the "Video and Audio Call" 210 type of conference, another set of preset parameters 140 are displayed on the screen as shown in FIG. 19. The displayed preset parameters 140 include the shared document 754, phone number 785, passcode 790, and video number 791. Based on the present information 145 that is receive from the user 170 in response to the preset parameters 140, the information handling system 127 associates the preset parameter 140 with the required conference room resources. In this particular example, the conference room resources are computers 5, speaker phones 44, lighting system 71, projector 16 and projector screen 48, webcams 800, HD cameras 2, headsets (not shown), and conference room microphones (not shown). The information handling system 127 will further determine an available conference room 101 and reserve such conference room 101 with the preset resources 135. At the start time 150 of the conference, the information handling system 127 sends at least one command 175 to power on the various preset resources 135, adjust the lighting system 71, dial the video number 791, and lower the projector screen 48. The user 170 arrives in the conference room 101 without having to setup the video call.

FIG. 20 is a schematic diagram depicting a "Rooms" web content page 792. The user 170 selects the "Rooms" tab and the information handling system 127 displays the list of rooms 101 on a screen. The user 170 can add additional rooms for the system to monitor.

FIG. 21 is a schematic diagram depicting a "People" web content page 793. The "People" web content page lists people and their roles for a particular conference room 101.

FIG. 22 is a schematic diagram depicting a "Recurrence" web content page 794 for the reoccurrence of a meeting. The user 170 selects the "Recurrence" tab and chooses how often and when a conference reoccurs.

Referring back to FIG. 13, if the user 170 selects an "Event" 750 type of conference, other preset parameters 140 are display as illustrated in FIG. 23. Referring to FIG. 23, the preset parameters 140 include the name of the meeting 795, the location 796, time zone 797, start time/date 798 and a description 799 of the event 750 type. The event 750 type is an occurrence of an action at a particular time. For example, when the user 170 selects the "Actions" tab 801, a list of actions 802 is available as shown in FIG. 24. The actions allow administrators to quickly and effectively send important messages to every room 101. A simple click broadcasts fire, safety, weather notifications and more to hundreds of rooms 101 instantly. Broadcast messages are displayed over the material shown on the screen—from sources like computers, DVDs and more—clearly alerting everyone in the room 101. The user 170 selects an action 802 from the list and the information handling system 127 executes the selected action at a particular time. For example, the user 170 selects and drags "Broadcast Fire Emergency" to the "Meeting Start" time folder. The information handling system 127 transmits the message to, for example, a computer monitor in the room 101. Broadcast messaging ensures a safe environment. Instructors can send an urgent memo to the main office, and administrators can alert presenters in every room with just one click. The "Action" tab 801 further includes an offset 803, which is a time that is offset from the starting time 150 of the meeting. For example, if the user 170 scheduled the meeting to start at 2:30 P.M. and the offset time is 30 minutes, then the message will be broadcast at 3:00 P.M. The user 170 may select and drag more than one action. The list of actions can include other types of actions beyond the ones that are listed.

FIG. 25 is a schematic diagram depicting a "Rooms" web content page 804. The "Rooms" web content page 804 illustrates the various rooms 101 that are categorized by the type of rooms. For example, the "Classrooms" includes the "Classroom 1" and "Classroom 2".

FIG. 26 is a schematic diagram depicting a "Recurrence" web content page 806. The user 170 is able to enable the recurrence of the meeting by replying to the various preset parameters 140 such as the number of recurrence and the day of the week of the recurrence, and the range of the recurrence.

FIG. 27 is a schematic diagram of the fifth sub-content page 559. The fifth sub-content page 559 may depict a Web-Cam content page. The user 170 is able to view the images from a webcam 800 that is placed in each of the conference room 101.

FIG. 28 is a schematic diagram depicting the sixth sub-content page 560. The sixth sub-content page 560 may be an "eControl" web content page. The information handling system 127 sends at least one command to control the preset resources 135 such as the conference room devices 102.

FIG. 29 is a schematic diagram depicting the seventh sub-content page 561. The seventh sub-content page 561 may be an "Instant Messaging" web content page. The user 170 is able to communicate with managers, users, media directors, IT specialists, and others via instant Messaging 530. It is contemplated that other communication protocols such as SMS, MMS, and email, also could be used.

FIG. 30 is a schematic diagram depicting the eighth sub-content page 562. The eighth sub-content page 562 may be an "Additional New Tab" web content page. The user 170 can add additional tabs. For example, the preset parameters 140 displayed on the computer screen may be the title of a tab or the web address of the web page.

FIG. 31 is a flowchart of a meeting management method including automated equipment setup in accordance with an illustrative embodiment of the present invention. In step 385, the information handling system 127 displays at least one preset parameter 140 associated with a conference type 130 on a screen of the user communication devices 28, 31, 33, 34, 36, 37. For example, the preset parameter 140 could be a selection of the type of conference 130 such as discussion 190, presentation 195, audio call 200, video call 205, and audio and video call 210. The user's selection, for example audio call 200, could then be preset information 145. The conference type 130 (e.g., audio call 200) is associated with preset resources 135 such as a computer 5, speaker phone 44, lighting system 71, projector 16 and projector screen 48. In step 390, the information handling system 127 accepts information defining the conference type 130 in response to the displayed preset resources 135.

In step 395, the information handling system 127 receives the preset information 145 from the at least one displayed preset parameter 140. The preset information 145 includes a start time 150 and an end time 155 of the conference. In step 400, the information handling system 127 determines a room 101 by communicating with a scheduling server 165 the availability of the preset resources 135 based on the received preset information 145. In step 405, the information handling system 127 sends or transmits at least one command 175 to control the associated preset resources 135 in response to the start time and end time 150, 155. For example, the information handling system 127 sends/transmits a command 175 to power on the lighting system and projector, lower the projector screen 48, display the shared file 754 onto the projector screen 48, and dial into the audio call using the phone number 785 and passcode 790. The user 170 arrives in the conference room 101 without having to setup the audio call since the information handling system 127 automatically setups the preset resources 135.

FIG. 32 includes additional steps that may be arranged in any manner to support operation in various configurations. More specifically, in step 420 communication takes place for the at least one preset parameter 140 between the information handling system 127 and one or more user communication devices 125. In step 425, preset information 145 is received between the information handling system 127 and the one or more user communication devices 125. The one or more user communication devices 125 include a personal computer 33, laptop computer 37, personal digital assistant 31, and cell phone 28. In step 430, the information handling system 127 monitors and controls at least one conference room device 102 in real-time. This is particularly useful for IT specialists to ensure that the conference room devices 102 are functioning properly and in case of a failure to allow the IT specialist to diagnose and fix the problem early on.

In step 410, the information handling system 127 powers on/off at least one of video projector 16, CD player 10, touch panel 290, audio system device 265, camera 2, DVD/DVR player 6, and VCR4. In step 415, the information handling system 127 controls at least one of light system device 71, touch panel 290, blinds/shades 14, HVAC 72, security 73, sensor 74, and local computer 5.

It should be noted that all of the content pages may be modified without departing from the teachings of the present invention.

In embodiments of the invention, a conference room resource of a conference room is a presentation capture device 1000 for recording conference activity, such as a presentation, a lecture, a board meeting, etc. The presentation capture device 1000 may be a Capture HD High-Definition Capture Recorder available from Crestron Electronics, Inc. of Rockleigh, N.J.

FIG. 33 is an illustration of a presentation capture device 1000 in operation during a multimedia presentation, according to an embodiment of the invention. The presentation capture device 1000 is configured for simultaneously recording content video, content audio, presenter video and presenter audio from a presentation.

Content video and content audio refer to audio visual (AV) media used by the presenter during the presentation and may be received as a digital signal or an analog signal. For example, content video may be a power point slideshow received from a computer. Content audio may be audio accompanying the PowerPoint slideshow.

Presenter video and presenter audio refer to AV media of the presenter or audience during the presentation. For example, presenter audio may be the audio of a professor's lecture received from the presentation capture device 1000 from a wireless microphone. Presenter video may be video of the presenter recorded during the lecture. In another example, presenter audio may also include questions asked by students in the audience of the lecture and presenter video may include a video of the student asking the question.

The presentation capture device 1000 as shown in FIG. 33 is receiving content video and content audio from a digital content source, such as a computer 1002, via a high-definition multimedia interface (HDMI) connection 1003. Additionally, the presentation capture device 1000 is receiving audio from and video of the lecturer 1001 via a wireless microphone 1004 and a video camera 1005, respectively.

The presentation capture device 1000 is configured to simultaneously record the content video, content audio, presenter audio and presenter video to a compressed audiovisual format. The presentation capture device 1000 mixes the content audio and presenter audio and combines the presenter video and content video, such as by positioning the presenter video as a picture-by-picture (PBP) window or a picture in picture (PIP) window.

The presentation capture device 1000 combines the audio and video as a compressed AV stream and outputs the compressed AV stream for capture (stored locally and uploaded to a server for archiving and on demand playback) or live streaming (transmitted as an AV stream over Ethernet). For example, the presentation capture device 1000 may output the compressed AV stream for storage on a USB memory stick 1007 which the lecturer may take with him. Alternatively, the presentation capture device 1000 may transmit the compressed AV stream on a network for remote storage. Additionally, the presentation capture device 1000 may output the compressed AV stream to a media server 1010 for live streaming over a network.

Additionally, the presentation capture device 1000 processes and distributes a combination of content audio, content video, presenter audio and presenter video to a digital sink 1006 for display during the lecture. For example, the presentation capture device 1000 may transmit content audio and content video to a television with embedded speakers. The presentation capture device 1000 may also transmit combined video of the content video and presenter video as well as combined audio of the content audio and presenter audio to a digital sink 1006. Advantageously, the presentation capture device 1000 is configured to detect the source type of incoming content audio and content video and automatically distribute the appropriate sources to a digital sink without requiring user interaction with the device, such as selecting a source.

FIG. 34 shows a schematic diagram depicting the system 100 for managing, scheduling and initiating a conference room 101 and/or conference room resources 102 based on preset information 145 in accordance with an illustrative embodiment of the invention. The presentation capture device 1000 is connected to the AV control system processor 40 via a wire line or wireless connection. As discussed previously, the AV control system processor provides a complete integrated AV or automation solution. Every audio, video, and environmental element of the conference room 101, including the presentation capture device 1000, becomes integrated and accessible through the AV system processor 40. In another embodiment of the invention, the presentation capture device 1000 communicates directly with the information handling system via the communication network 104. A media server 1010 communicates with the information handling system 127 and the presentation capture device 1000, either directly or via the AV control system processor 40 over the communication network 104.

By employing the information handling system, users can schedule recording sessions on the presentation capture device 1000 and view the status of the presentation capture device 1000. The presentation capture device 1000 may receive preset information from the information handling system which includes preset recording settings and metadata information concerning the AV file to be created. The presentation capture device 1000 records the scheduled presentation and uploads the recorded AV file and associated metadata file to the media server 1010. The media server 1010 transcodes the AV file and transforms the metadata file into various formats depending on desired distribution channels. The media server 1010 then uploads the AV file and metadata file to those desired distribution channels via the communication network 104. The media server 1010 also informs the information handling system as to the status of the AV file and metadata file enabling monitoring by the user.

The information handling system is configured for reporting the status of presentation capture devices 1000 located in monitored rooms to the user; associating presentation capture devices 1000 to room schedules; providing an interface for the user to configure presentation capture device 1000 settings for scheduled meetings; uploading the room schedule (including recording settings and metadata) to presentation capture devices 1000; and monitoring and logging items that are processed by the media server 1010.

Presentation capture device 1000 is configured for reporting to the AV control system processor the name of the presentation capture device 1000, the room in which the presentation capture device 1000 is located, whether the presentation capture device 1000 is currently capturing content or not, the name of the next presentation to be recorded, the start time and date of the next presentation to be recorded and various messages which require user intervention.

In operation, the user 170 may click on the calendar 737 to create a conference. Referring to FIG. 35 and back to FIG. 13, a pop-up window 741 with preset parameters 140 are displayed. In one embodiment, the pop-up window 741 includes the preset parameter 140 asking for "What will this meeting be?" The user 170 picks either meeting 745 or event 750 type of conference and the user's choice is the preset information 145. In this embodiment, if the user 170 chooses the meeting 745 type of conference a set of preset parameters 140 are displayed on a screen of the user 170 communication devices 28, 31, 33, 34, 36, 37 as shown in FIG. 35. Compared to the set of preset parameters shown in FIG. 14, there are five (5) tabs associated with a set of preset parameters, with the additional tab of preset parameters being the Capture tab 1020.

When the user selects the conference type as shown in FIG. 35, another set of preset parameters are displayed on the screen as shown in FIG. 36. The preset parameters are associated with the conference type 130, specifically whether the conference type will be recorded with a presentation capture device 1000. The preset parameters include the recording profile 1030, the capture size 1032, and the notification preference 1034.

Refer to FIG. 37, in one embodiment, if the conference room does not currently include a capture device, instead of displaying preset parameters, the information handling system will display a text notification 1036 directing the user to a website providing marketing and sales information for presentation capture devices 1000.

The recording profile preset is selected from a dropdown list of selections which may include default and custom profiles. The profile itself comprises a number of preconfigured parameters including distribution channel parameters, notification setting parameters and profile variable parameters. The preconfigured parameters are set from a series of setup menus during a registration process.

FIG. 38 is a registration page showing links to preconfigure preset parameters. The registration page includes links to setup menus enabling a user to: add/edit a recording profile, add/edit a distribution channel, add/edit post-processing parameters, and add/edit encoding parameters.

FIG. 39 is a setup menu showing the distribution channel parameters which may be preconfigured for a recording profile. The user first selects a template 1050, such as an iTunes University template, from a dropdown menu. Next the user configures Distribution Channel Details parameters by filling in the text field. The Distribution Channel Details parameters provide nominal information for the recording profile such as a title 1051 and a description 1052. Next the user preconfigures AV workflow functions comprising post-processing parameters 1053, one or more encoding parameters 1054a-e and distribution function parameters. The user selects post-processing parameters 1053 from a list of preconfigured post-processing profiles and one or more encoding parameters 1054 a-e from a list of preconfigured encoding profiles. As will be described below, the post-processing profiles and encoding profiles are preconfigured, as well, from setup menus. Finally the user preconfigures the distribution function parameters by selecting a distribution method 1055 from a drop down menu of distribution methods and filling in text fields 1056, 1057, 1058, 1059 to preconfigure a server to publish data and media to internal and public uniform resource locator (URL) addresses.

These text fields are used by the information handling system to determine where to upload the files after processing. For example, if the user selects RSS distribution from the drop down menu, the Data and Media public URL fields populate fields in an XML metadata file for a flash player to access these files.

FIG. 40 is a setup menu showing the post-processing parameters which may be preconfigured for a recording profile. The user first selects a template 1060 from a dropdown menu. Next the user configures Post Processing Details parameters by filling in the text field for a Title 1061 and a Description 1062. Next the user configures preset parameters for a watermark by selecting a type of watermark 1063 from a dropdown menu, inputting an image URL 1064, inputting text 1065 and selecting a position 1066 for the watermark. Finally, the user inputs an intro URL 1067 and an exit URL for bookending 1068.

FIG. 41 is a setup menu showing the encoding parameters which may be preconfigured as part of a recording profile. The user first selects a template 1070 from a drop down menu. Next the user supplies nominal information for the encoding profile by populating title 1071 and description fields 1072. Next the user selects a container format 1073 from a drop down list of selections. Next the user selects video setting preset parameters by selecting a video CODEC 1074, a resolution 1075 and a video bitrate 1076 from dropdown menus. Similarly, the user selects audio setting preset parameters by selecting an audio CODEC 1077, a number of channels 1078, a sampling frequency 1079, and an audio bitrate 1080.

INDUSTRIAL APPLICABILITY

To solve the aforementioned problems, the present invention is methods, systems, and software for managing, scheduling, and initiating conference rooms and/or conference room resources based on a type of conference.

LIST OF ACRONYMS USED IN THE DETAILED DESCRIPTION OF THE INVENTION

The following is a list of the acronyms used in the specification in alphabetical order.
AV Audio Visual
CD Compact Disc
DVD Digital Video Disc or Digital Versatile Disc
DVR Digital Video Recorder
HDMI high definition multimedia interface
HVAC Heating, Ventilating, and Air Conditioning
IT Information Technology
PC Personal Computer
RSS really simple syndication
URL uniform resource locator
USB universal serial bus
VCR Videocassette Recorder

ALTERNATE EMBODIMENTS

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

For example, any of the flow diagrams described herein may be modified or arranged in any manner to support operation in various configurations. The flow diagrams may include more or fewer blocks, combined or separated blocks, alternative flow arrangements, or the like. The flow diagrams may also be implemented in the form of hardware, firmware, or software. If implemented in software, the software may be written in any suitable code in accordance with the example embodiments herein or other embodiments. The software may be stored in any form of computer readable medium and loaded and executed by a general purpose or application specific processor suitable to perform the example embodiments described herein or other embodiments.

What is claimed is:

1. A system, comprising:
   (a) at least one processor;
   (b) a memory;
   (c) at least one data storage device operably associated with the memory and the at least one processor;
   (d) at least one communication interface operably associated with the at least one processor and memory, the at least one communication interface being configured to enable communication between the information handling system and one or more user communication devices; and
   (e) at least one program of instructions stored in the memory and being executable in the processor, the program of instructions being operable to:
      (i) accept information defining a presentation type of meeting, the presentation type of meeting being associated with preset resources including a presentation capture device,
      (ii) display at least one presentation preset parameter based on the presentation type of meeting,
      (iii) receive presentation preset information from the at least one displayed presentation preset parameter, the presentation preset information including a start time, an end time, and shared documentation,
      (iv) automatically determine a room by communicating with a scheduling server the availability of the preset resources based on the received presentation preset information,
      (v) notify a conference initiator of the room, and
      (vi) send at least one command to control at least one of the associated preset resources in response to the start time and the end time,
      wherein the at least one presentation preset parameter includes a recording profile, the presentation preset information includes a preconfigured recording profile, the preconfigured recording profile includes at least one AV workflow function, the at least one AV workflow function includes an encoding profile, and the encoding profile includes a video CODEC preset parameter, a resolution preset parameter and a video bitrate preset parameter.

2. The system of claim 1 wherein the at least one program of instructions operable to send the at least one command includes instructions to:
   (a) power on/off the presentation capture device, and
   (b) initiate/end recording for live streaming, and
   (c) initiate/end uploading for live streaming.

3. The system of claim 1 wherein the preset resources include a content source coupled to a presentation capture device.

4. The system of claim 3 wherein the at least one program of instructions operable to send the at least one command includes instructions to:
   (a) power on/off the content source and content sink, and
   (b) initiate the content source to begin sending shared documentation to the presentation capture device.

5. The system of claim 1 wherein the at least one AV workflow function comprises a post-processing profile.

6. The system of claim 5 wherein the post-processing profile comprises at least one watermark preset parameter.

7. The system of claim 1 wherein the encoding profile comprises at least one container format preset parameter.

8. The system of claim 1 wherein the preconfigured recording profile further comprises at least one distribution function preset parameter.

9. The system of claim 8 wherein the at least one distribution function preset parameter comprises a distribution method.

10. The system of claim 1 wherein the at least one presentation preset information comprises a notification preference.

11. A system, comprising:
    (a) at least one processor;
    (b) a memory;
    (c) at least one data storage device operably associated with the memory and the at least one processor;
    (d) at least one communication interface operably associated with the at least one processor and memory, the at least one communication interface being configured to enable communication between the information handling system and one or more user communication devices; and
    (e) at least one program of instructions stored in the memory and being executable in the processor, the program of instructions being operable to:
       (i) accept information defining a presentation type of meeting, the presentation type of meeting being associated with preset resources including a presentation capture device,
       (ii) display at least one presentation preset parameter based on the presentation type of meeting,
       (iii) receive presentation preset information from the at least one displayed presentation preset parameter, the presentation preset information including a start time, an end time, and shared documentation,
       (iv) automatically determine a room by communicating with a scheduling server the availability of the preset resources based on the received presentation preset information,
       (v) notify a conference initiator of the room, and
       (vi) send at least one command to control at least one of the associated preset resources in response to the start time and the end time,
       wherein the at least one presentation preset parameter includes a recording profile, the presentation preset information includes a preconfigured recording profile, the preconfigured recording profile includes at least one AV workflow function, the at least one AV workflow function includes an encoding profile, and the encoding profile comprises an audio CODEC preset parameter, an audio channels preset parameter, a sampling frequency preset parameter and an audio bitrate preset parameter.

12. A method for managing a room reservation, the method comprising:
    (a) accepting information defining a presentation type of meeting, the presentation type of meeting being associated with preset resources including a presentation capture device;
    (b) displaying at least one preset presentation parameter based on the presentation type of meeting;
    (c) receiving presentation preset information from the at least one displayed presentation preset parameter, the presentation preset information including a start time an end time, and a shared documentation;

(d) automatically determining a room by communicating with a scheduling server the availability of the preset resources based on the received presentation preset information; and
(e) sending at least one command to control at least one of the associated preset resources in response to the start time and end time, including powering on/off the presentation capture device,
(f) wherein the at least one presentation preset parameter includes a recording profile, the presentation preset information includes a preconfigured recording profile, the preconfigured recording profile includes at least one AV workflow function, the at least one AV workflow function includes an encoding profile, and the encoding profile includes:
    (i) a video CODEC preset parameter, a resolution preset parameter and a video bitrate preset parameter, or
    (ii) an audio CODEC preset parameter, an audio channels preset parameter, a sampling frequency preset parameter and an audio bitrate preset parameter.

13. The method of claim 12 wherein the sending at least one command to control at least one of the associated preset resources in response to the start time and end time includes sending a command to the presentation capture device to upload presentation capture device for live streaming.

14. The method of claim 12 wherein the presentation preset information is a presentation slide show to be displayed during the presentation.

* * * * *